(12) United States Patent
Okamoto et al.

(10) Patent No.: US 12,574,472 B2
(45) Date of Patent: Mar. 10, 2026

(54) INFORMATION PROCESSING SYSTEM AND INFORMATION PROCESSING METHOD

(71) Applicants: Sony Group Corporation, Tokyo (JP); Sony Semiconductor Solutions Corporation, Kanagawa (JP)

(72) Inventors: Eizo Okamoto, Kanagawa (JP); Hirotomo Ema, Fukuoka (JP); Koji Takamiya, Tokyo (JP); Shoji Yamane, Aichi (JP)

(73) Assignees: Sony Group Corporation (JP); Sony Semiconductor Solutions Corporation (JP)

( * ) Notice: Subject to any disclaimer, the term of this patent is extended or adjusted under 35 U.S.C. 154(b) by 24 days.

(21) Appl. No.: 18/706,117

(22) PCT Filed: Nov. 18, 2022

(86) PCT No.: PCT/JP2022/042794
§ 371 (c)(1),
(2) Date: Apr. 30, 2024

(87) PCT Pub. No.: WO2023/100680
PCT Pub. Date: Jun. 8, 2023

(65) Prior Publication Data
US 2025/0016285 A1 Jan. 9, 2025

(30) Foreign Application Priority Data
Dec. 3, 2021 (JP) .................................. 2021-196611

(51) Int. Cl.
*H04N 7/08* (2006.01)
(52) U.S. Cl.
CPC ..................................... *H04N 7/08* (2013.01)

(58) Field of Classification Search
CPC ............ H04N 7/08; H04N 5/06; H04N 5/073; H04N 5/262; H04N 23/60; H04N 7/0127;
(Continued)

(56) References Cited

U.S. PATENT DOCUMENTS

| | | | | |
|---|---|---|---|---|
| 2007/0070221 A1* | 3/2007 | Nishi | ........................ | G06T 5/10 |
| | | | | 348/E5.079 |
| 2008/0024683 A1* | 1/2008 | Damera-Venkata | ........................ | |
| | | | | H04N 9/3194 |
| | | | | 348/383 |

(Continued)

FOREIGN PATENT DOCUMENTS

| | | |
|---|---|---|
| CN | 103347144 A | 10/2013 |
| CN | 111899680 A | 11/2020 |

(Continued)

OTHER PUBLICATIONS

International Search Report for PCT/JP2022/042794 mailed Feb. 7, 2023. 3 pages.

*Primary Examiner* — Michael Lee
(74) *Attorney, Agent, or Firm* — Lerner David LLP

(57) ABSTRACT

The present technology relates to an information processing system and an information processing method capable of, on the basis of an imaging equipment synchronization signal, performing processing on a video signal of a frame rate different from a frequency of the imaging equipment synchronization signal.

On the basis of a genlock signal as the imaging equipment synchronization signal, a signal processing unit performs output video signal generation processing on an input video signal that is a video signal of an input frame rate different from a frequency of the genlock signal. A signal output IF outputs an output video signal of an output frame rate (Continued)

different from the frequency of the genlock signal on the basis of the output video signal generation processing on the input video signal.

18 Claims, 17 Drawing Sheets

(58) Field of Classification Search
CPC .... H04N 23/745; H04N 5/2224; H04N 23/63; H04N 7/0132; H04N 7/104; G09G 2300/026; G09G 2320/0693; G09G 5/12; G09G 5/18; G09G 2340/0435; G09G 3/20; G09G 3/32; G06F 3/1446
See application file for complete search history.

(56) References Cited

U.S. PATENT DOCUMENTS

| | | | | |
|---|---|---|---|---|
| 2009/0015513 | A1* | 1/2009 | Kim | G06F 3/1446 |
| | | | | 345/1.3 |
| 2010/0091185 | A1* | 4/2010 | Ueno | G09G 3/3611 |
| | | | | 348/E7.003 |
| 2010/0289928 | A1* | 11/2010 | Yano | H04N 5/213 |
| | | | | 348/241 |
| 2014/0186006 | A1* | 7/2014 | Jin | H04N 5/783 |
| | | | | 386/230 |
| 2015/0215497 | A1* | 7/2015 | Zhang | H04N 21/6336 |
| | | | | 348/521 |
| 2016/0381331 | A1* | 12/2016 | Sprenger | H04N 9/3188 |
| | | | | 348/745 |
| 2017/0340969 | A1* | 11/2017 | Lim | G06F 3/013 |
| 2018/0040348 | A1* | 2/2018 | Hayakawa | H04N 7/0127 |
| 2020/0143772 | A1* | 5/2020 | Huang | G09G 5/18 |
| 2020/0228706 | A1* | 7/2020 | Park | H04N 23/651 |
| 2020/0380775 | A1* | 12/2020 | Araki | H04N 19/597 |
| 2020/0412898 | A1 | 12/2020 | Onuma | |
| 2021/0289151 | A1* | 9/2021 | Eki | H04N 25/78 |
| 2022/0103738 | A1 | 3/2022 | Deighton | |

FOREIGN PATENT DOCUMENTS

| | | | |
|---|---|---|---|
| CN | 114783355 | A | 7/2022 |
| JP | 2001292336 | A | 10/2001 |
| JP | 2006295854 | A | 10/2006 |
| JP | 2009010903 | A | 1/2009 |
| JP | 2011234347 | A | 11/2011 |

* cited by examiner

Figure 4:
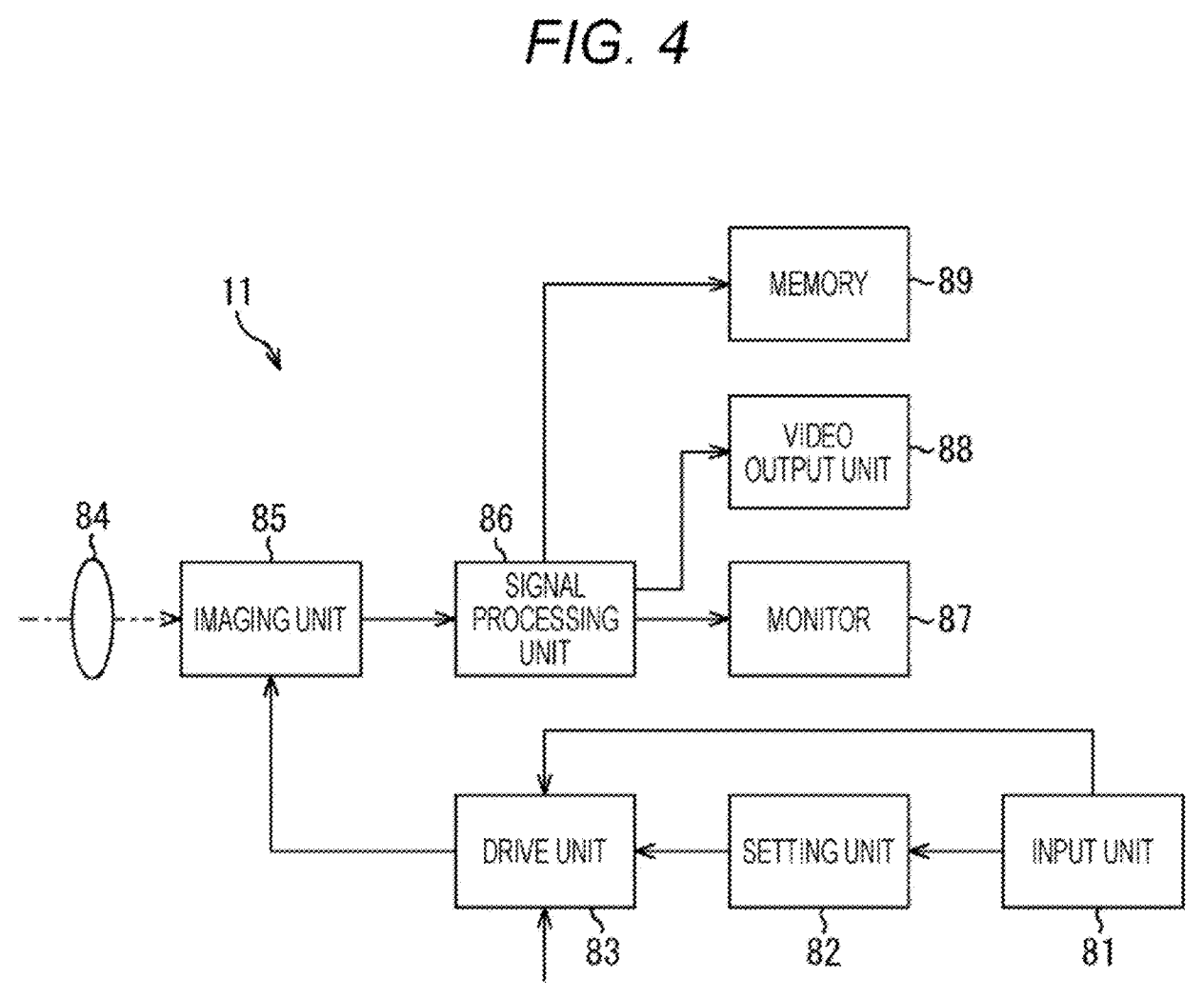

85 — IMAGING UNIT

86 — SIGNAL PROCESSING UNIT

89 — MEMORY

88 — VIDEO OUTPUT UNIT

87 — MONITOR

81 — INPUT UNIT

82 — SETTING UNIT

83 — DRIVE UNIT

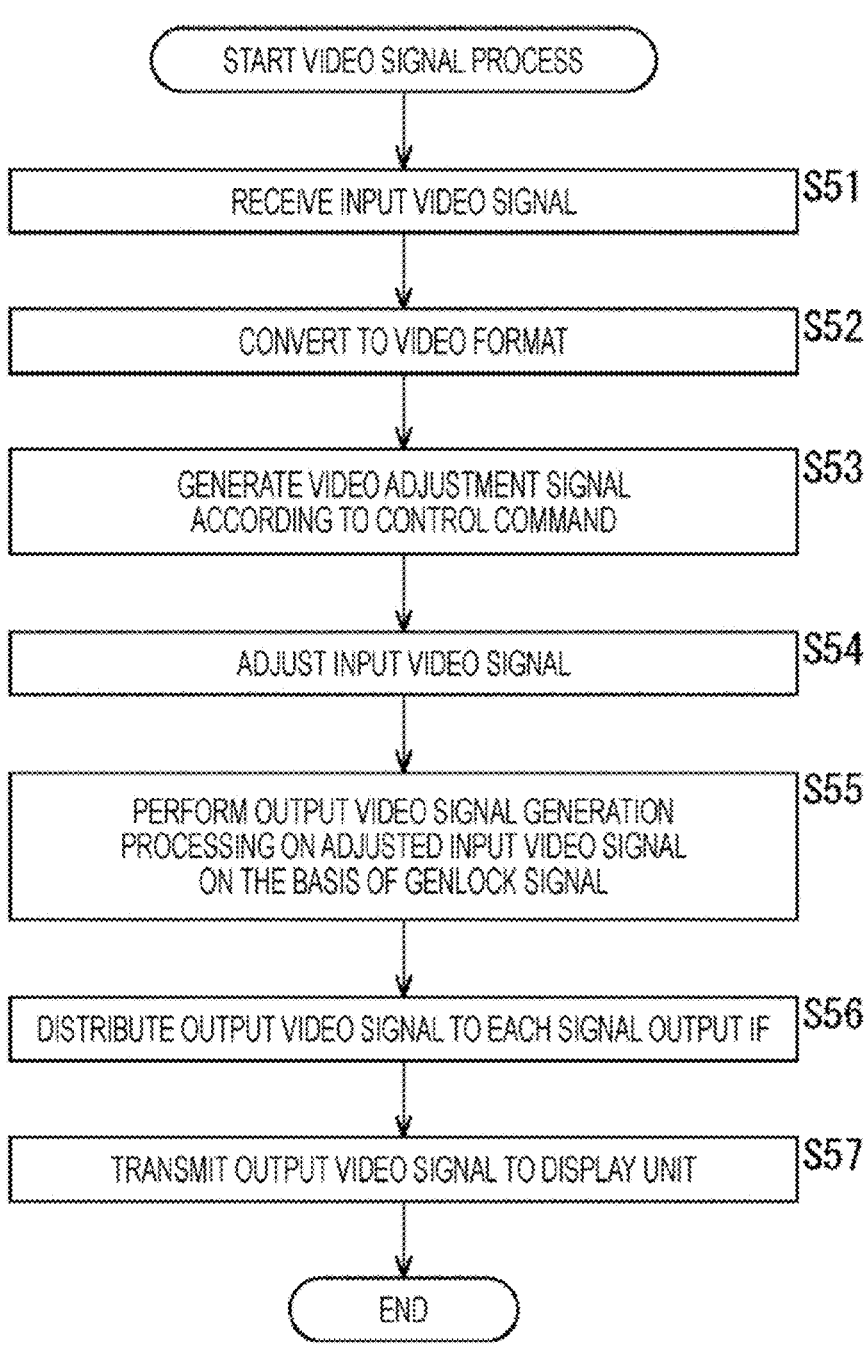

START VIDEO SIGNAL PROCESS

RECEIVE INPUT VIDEO SIGNAL — S51

CONVERT TO VIDEO FORMAT — S52

GENERATE VIDEO ADJUSTMENT SIGNAL
ACCORDING TO CONTROL COMMAND — S53

ADJUST INPUT VIDEO SIGNAL — S54

PERFORM OUTPUT VIDEO SIGNAL GENERATION
PROCESSING ON ADJUSTED INPUT VIDEO SIGNAL
ON THE BASIS OF GENLOCK SIGNAL — S55

DISTRIBUTE OUTPUT VIDEO SIGNAL TO EACH SIGNAL OUTPUT IF — S56

TRANSMIT OUTPUT VIDEO SIGNAL TO DISPLAY UNIT — S57

END

FIG. 15

INFORMATION PROCESSING SYSTEM AND INFORMATION PROCESSING METHOD

CROSS-REFERENCE TO RELATED APPLICATIONS

This application is a national phase entry under 35 U.S.C. § 371 of International Application No. PCT/JP2022/042794 filed Nov. 18, 2022, which claims the priority from Japanese Patent Application No. 2021-196611 filed in the Japanese Patent Office on Dec. 3, 2021, the entire contents of which are hereby incorporated by reference.

TECHNICAL FIELD

The present technology relates to an information processing system and an information processing method, and more particularly, to an information processing system and an information processing method capable of performing processing on a video signal of a frame rate different from a frequency of an imaging equipment synchronization signal on the basis of the imaging equipment synchronization signal.

BACKGROUND ART

In recent years, a market for a direct-view display such as a light emitting diode (LED) display is expanding. For example, a virtual production in which a background such as a landscape is reproduced by displaying the background on an LED display at a content production site and the background and a subject are imaged (re-imaged) by a camera has rapidly grown.

In such a virtual production, it is necessary to synchronize a display video which is a video displayed on an LED display and a re-imaged video which is a video re-imaged by a camera for the purpose of suppressing occurrence of a black belt. This synchronization is performed using an imaging equipment synchronization signal such as a genlock (Gen Lock) signal. Note that a camera device that outputs a video signal obtained by imaging in synchronization with a genlock signal is described in, for example, Patent Document 1.

On the other hand, in a virtual production, there is a demand for increasing a frame rate of a display video with respect to a frame rate of a re-imaged video and reducing latency of a display video in a re-imaging environment. For example, in a case where a frame rate of the re-imaged video of the camera is 24 fps, there is a demand for displaying a video of 60 fps or 120 fps on the LED display.

However, a normal device performs processing on a video signal having the same frame rate as a frequency of an imaging equipment synchronization signal on the basis of the imaging equipment synchronization signal, and it is difficult to perform processing on a video signal having a frame rate different from the frequency of the imaging equipment synchronization signal. Therefore, for example, in a case where the re-imaged video and the display video are synchronized by the imaging equipment synchronization signal having the same frequency as the frame rate of the re-imaged video of the camera, it is difficult to display a video based on a video signal having a frame rate different from the frame rate of the re-imaged video on the basis of the imaging equipment synchronization signal.

CITATION LIST

Patent Document

Patent Document 1: Japanese Patent Application Laid-Open No. 2011-234347

SUMMARY OF THE INVENTION

Problems to be Solved by the Invention

As described above, it is desired to perform processing on a video signal of a frame rate different from the frequency of the imaging equipment synchronization signal on the basis of the imaging equipment synchronization signal, but such a demand is not sufficiently met.

The present technology has been made in view of such a situation, and enables processing to be performed on a video signal of a frame rate different from the frequency of the imaging equipment synchronization signal on the basis of the imaging equipment synchronization signal.

Solutions to Problems

An information processing system according to one aspect of the present technology is an information processing system including: a signal processing unit that, on the basis of an imaging equipment synchronization signal, performs processing on an input video signal that is a video signal of a first frame rate different from a frequency of the imaging equipment synchronization signal; and an output unit that outputs a video signal of a frame rate different from the frequency of the imaging equipment synchronization signal on the basis of the processing on the input video signal.

An information processing method according to one aspect of the present technology is an information processing method in an information processing system, the method including: a signal processing step of, on the basis of an imaging equipment synchronization signal, performing processing on an input video signal that is a video signal of a first frame rate different from a frequency of the imaging equipment synchronization signal; and an output step of outputting a video signal of a frame rate different from the frequency of the imaging equipment synchronization signal on the basis of the processing on the input video signal.

In one aspect of the present technology, processing is performed on the input video signal that is a video signal of the first frame rate different from a frequency of the imaging equipment synchronization signal on the basis of the imaging equipment synchronization signal, and a video signal of a frame rate different from the frequency of the imaging equipment synchronization signal is output on the basis of the processing on the input video signal.

Note that the information processing system may be an independent device, a module incorporated in another device, or a plurality of devices.

The information processing system according to an aspect of the present technology can be implemented by causing a computer to execute a program.

Furthermore, in order to implement the information processing system according to an aspect of the present technology, the program to be executed by the computer can be provided by being transmitted via a transmission medium, or being recorded on a recording medium.

BRIEF DESCRIPTION OF DRAWINGS

FIG. 1 is a diagram illustrating an outline of an embodiment of a re-imaging system to which the present technology is applied.

FIG. 3 is a diagram illustrating a configuration example of the re-imaging system.

FIG. 4 is a block diagram illustrating a configuration example of the video camera.

FIG. 8 is a diagram illustrating a configuration example of an LED array.

FIG. 12 is a flowchart explaining video signal processing.

FIG. 15 is a diagram illustrating another example of the re-imaging system.

MODE FOR CARRYING OUT THE INVENTION

Figure 2:
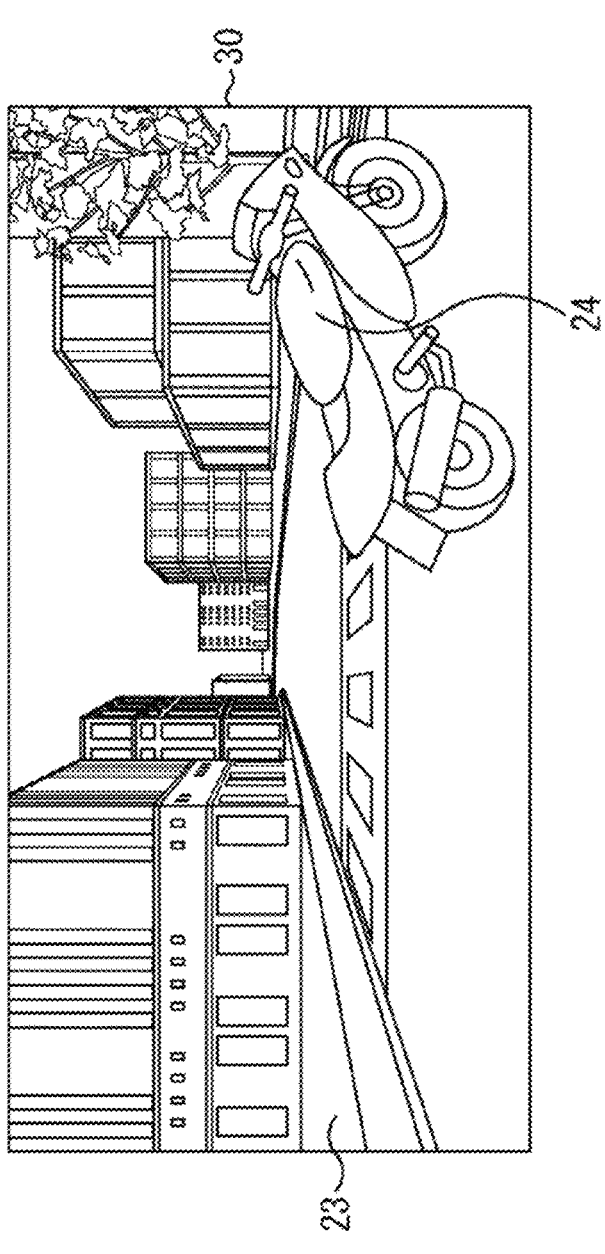
FIG. 2 is a diagram illustrating a video re-imaged by a video camera.

A mode for carrying out the present technology (hereinafter, referred to as an embodiment) will be hereinafter described. Note that the description is given in the following order.

1. One embodiment (re-imaging system)
2. A case where video wall controller cannot perform processing on video signal of frame rate different from frequency of genlock signal on the basis of genlock signal Note that in the drawings referred to in the following description, the same or similar portions are denoted by the same or similar reference signs.

One Embodiment

<Outline of Re-Imaging System>

Figure 1:
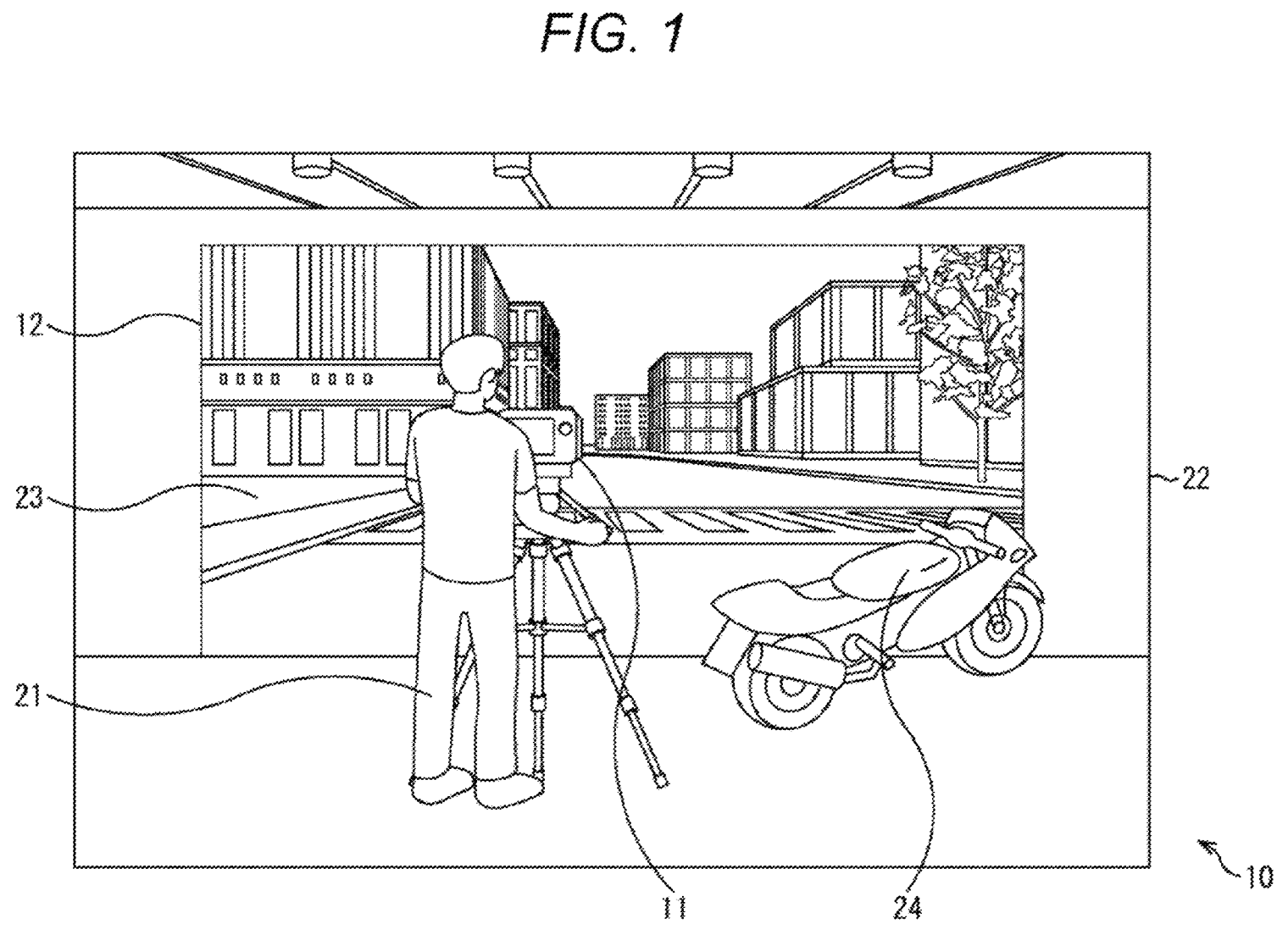

FIG. 1 is a diagram for describing an outline of an embodiment of a re-imaging system including an information processing system to which the present technology is applied.

As illustrated in FIG. 1, a re-imaging system 10 is, for example, a system used for virtual production, and includes a video camera 11 and a video wall 12. An imager 21 uses the video camera 11 to re-image a motorcycle 24, which is the subject, with a video 23 displayed on the video wall 12 installed in a studio 22 as the background.

<Example of Re-Imaged Video>

FIG. 2 is a view illustrating a video re-imaged by the video camera 11 in FIG. 1.

As illustrated in FIG. 2, a video 30 re-imaged by the video camera 11 is a video as if the motorcycle 24 is present in a place where the video 23 was imaged. In this manner, the imager 21 can image the video 30 as if the motorcycle 24 is present in the place where the video 23 was imaged in the studio 22 by performing re-imaging using the re-imaging system 10.

<Configuration Example of Re-Imaging System>

Figure 3:
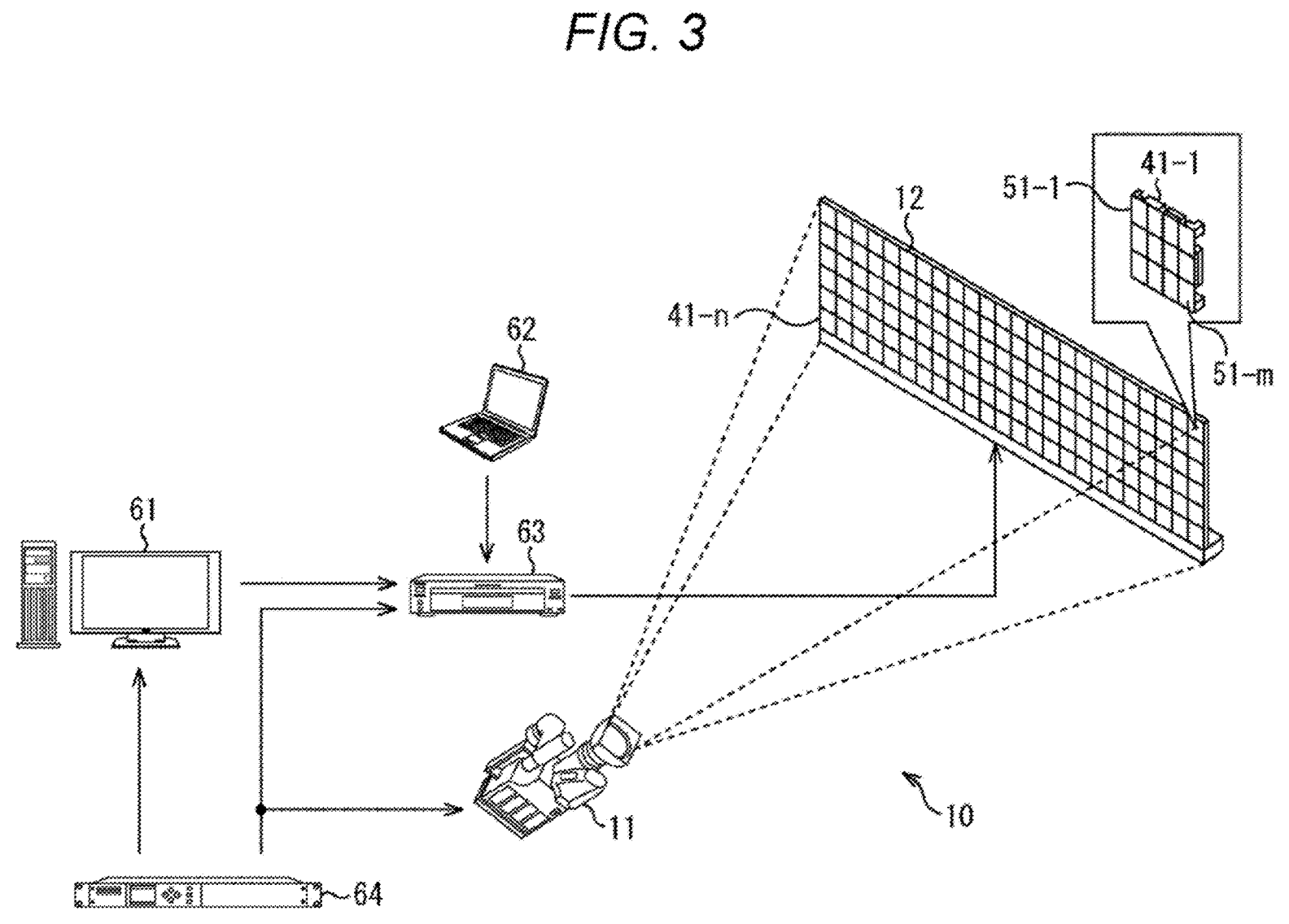

FIG. 3 is a diagram illustrating a configuration example of the re-imaging system 10.

As illustrated in FIG. 3, the re-imaging system 10 (information processing system) includes a video server 61, a personal computer (PC) 62, a video wall controller 63, and a clock generator 64, in addition to the video camera 11 and the video wall 12.

The video camera 11 is an imaging device that performs imaging by a rolling shutter system. In response to an imaging start instruction from the imager 21, the video camera 11 images (re-images) the video displayed on the video wall 12 as a background. This imaging is performed with a frequency of a genlock signal as a frame rate of a re-imaged video (imaged video) of the video camera 11 in synchronization with the genlock signal as an imaging equipment synchronization signal input from the clock generator 64. In the present specification, the frequency of the genlock signal is assumed to be 23.98 (24) Hz, which is a general frame rate of a movie, but is not limited thereto. Note that, in the re-imaging system 10, a plurality of video cameras each similar to the video camera 11 may be used.

The video wall 12 (display section) is a large LED display in which n (n is a positive integer) display units (cabinets) 41-1 to 41-$n$ are arranged in a tile shape. FIG. 3 illustrates a case where n is 6×24. Note that, hereinafter, in a case where it is not necessary to distinguish the display units 41-1 to 41-$n$ individually, they are simply referred to as a display unit 41.

The display unit 41 includes m (m is a positive integer) LED arrays 51-1 to 51-$m$ in each of which LEDs (not illustrated) corresponding to respective pixels are arranged in a matrix (two-dimensional array) arranged in a tile shape. FIG. 3 illustrates a case where m is 4×3. Note that, hereinafter, in a case where it is not necessary to distinguish the LED arrays 51-1 to 51-$m$ individually, they are simply referred to as an LED array 51.

Each display unit 41 of the video wall 12 (first device) is connected to the video wall controller 63 (second device) by a cable such as a local area network (LAN) cable. The video wall 12 displays a video corresponding to a video signal in units of frames on the basis of the video signal in units of frames supplied from the video wall controller 63. Specifically, the video signal supplied to each display unit 41 is a video signal corresponding to the position of the display unit 41 on the video wall 12. Each display unit 41 displays a video based on the video signal, whereby a video of one frame is displayed on the entire video wall 12.

The video server 61 includes, for example, a server computer and the like, and stores a video signal in units of frames such as video content. The frame rate of the video signal is different from the frequency of the genlock signal. In the present embodiment, the frame rate of the video signal is 59.94 (60) fps, but is not limited thereto, and may be 119.88 (120) fps or the like. A frame synchronization signal having the same frequency as the frame rate of the video signal is input from the clock generator 64 to the video server 61 (video signal supply unit). The video server 61 supplies the stored video signal in units of frames to the video wall controller 63 in synchronization with the frame synchronization signal.

Instead of the video server 61, a video signal in units of frames may be provided from a recording medium such as a hard disk drive (HDD) or a Blu-ray disc (BD) (registered trademark) to the video wall controller 63. In this case, the frame synchronization signal is input to the video wall controller 63, and the video wall controller 63 reads the video signal in units of frames from the recording medium in synchronization with the frame synchronization signal.

The PC 62 is a general general-purpose computer. The PC 62 controls the video wall controller 63 by generating a control command for controlling the video wall controller 63 and transmitting the control command to the video wall controller 63.

The genlock signal is input from the clock generator 64 to the video wall controller 63. The video wall controller 63 (information processing system) performs predetermined signal processing on an input video signal that is a video signal in units of frames input from the video server 61 on the basis of the genlock signal and the control command supplied from the PC 62. For example, the video wall controller 63 performs, on the basis of the genlock signal, output video signal generation processing of generating, for the input video signal, a video signal of an output frame rate (second frame rate) that is synchronized with the genlock signal and is a frame rate set on the basis of an input frame rate (first frame rate) that is a frame rate of the input video signal. The output frame rate is different from the frequency of the genlock signal, and is set to, for example, an integral multiple of the frequency of the genlock signal. The video wall controller 63 divides the output video signal obtained as a result of the predetermined signal processing into n pieces according to the position of the display unit 41, and transmits the divided output video signal to each display unit 41.

The clock generator 64 (signal generator) generates a genlock signal and inputs the genlock signal to the video camera 11 and the video wall controller 63. Furthermore, the clock generator 64 generates a frame synchronization signal whose start timing is synchronized with the genlock signal, and inputs the frame synchronization signal to the video server 61.

Note that the video wall controller 63 and the video wall 12 may have an integrated configuration, and may be a display device in which they are integrated. Furthermore, the PC 62, the video wall controller 63, and the video wall 12 may have an integrated configuration, and may be a display device in which they are integrated.

<Configuration Example of Video Camera>

FIG. 4 is a block diagram illustrating a configuration example of the video camera 11.

The video camera 11 in FIG. 4 includes an input unit 81, a setting unit 82, a drive unit 83, an optical system 84, an imaging unit 85, a signal processing unit 86, a monitor 87, a video output unit 88, and a memory 89.

The input unit 81 receives an input from the imager 21 and generates an input signal indicating the input content. For example, the imager 21 operates the input unit 81 to input an appropriate exposure time in consideration of the restriction of the dynamic range when (the intensity of) light is converted into (the amount of) signal charges in the imaging unit 85. In this case, the input unit 81 generates an input signal indicating the exposure time and supplies the input signal to the setting unit 82. In a case where the imager 21 operates the input unit 81 to input the imaging start instruction, the input unit 81 generates an input signal indicating imaging start and supplies the input signal to the drive unit 83.

On the basis of an input signal from the input unit 81, the setting unit 82 sets imaging information that is various types of information about imaging such as an exposure time indicated by the input signal. The setting unit 82 supplies the imaging information to the drive unit 83.

The drive unit 83 acquires the genlock signal from the clock generator 64 of FIG. 3. In response to the imaging start instruction from the input unit 81, the drive unit 83 generates a drive signal that is a control signal for driving each pixel unit arranged in a matrix on the light receiving surface of the imaging unit 85 so as to perform imaging based on the imaging information from the setting unit 82 at the same frame rate as the frequency of the genlock signal in synchronization with the genlock signal. The drive unit 83 outputs the drive signal to the imaging unit 85.

The optical system 84 includes one or a plurality of lenses, guides light (incident light) from a subject or the like to the imaging unit 85, and forms an image on a light receiving face of the imaging unit 85.

The imaging unit 85 includes a complementary metal oxide semiconductor (CMOS) image sensor or the like. The imaging unit 85 drives each pixel unit according to a drive signal supplied from the drive unit 83, and performs imaging by a rolling shutter system. Specifically, in accordance with the drive signal supplied from the drive unit 83, the imaging unit 85 outputs an electric signal corresponding to the charge accumulated in each pixel unit in units of rows. Then, the imaging unit 85 starts accumulation of charges corresponding to light incident on each pixel unit via the optical system 84 in units of rows. In accordance with the drive signal supplied from the drive unit 83, the imaging unit 85 reads electric signals corresponding to the charges accumulated for the exposure time set by the setting unit 82 in units of rows and transfers the electric signals to the signal processing unit 86 in units of columns. As described above, the imaging unit 85 performs imaging with the exposure time set by the setting unit 82.

The signal processing unit 86 performs various types of signal processes on the electric signal according to the charge transferred from the imaging unit 85, and converts the electric signal into a video signal in units of frames of a predetermined digital video format. The video signal in units of frames is supplied to the monitor 87 and the video output unit 88, or supplied to the memory 89 and stored (recorded). The monitor 87 displays the video in units of frames on the basis of the video signal in units of frames supplied from the signal processing unit 86. The video output unit 88 outputs the video signal in units of frames supplied from the signal processing unit 86 to the outside of the video camera 11.

<Configuration Example of PC>

Figure 5:
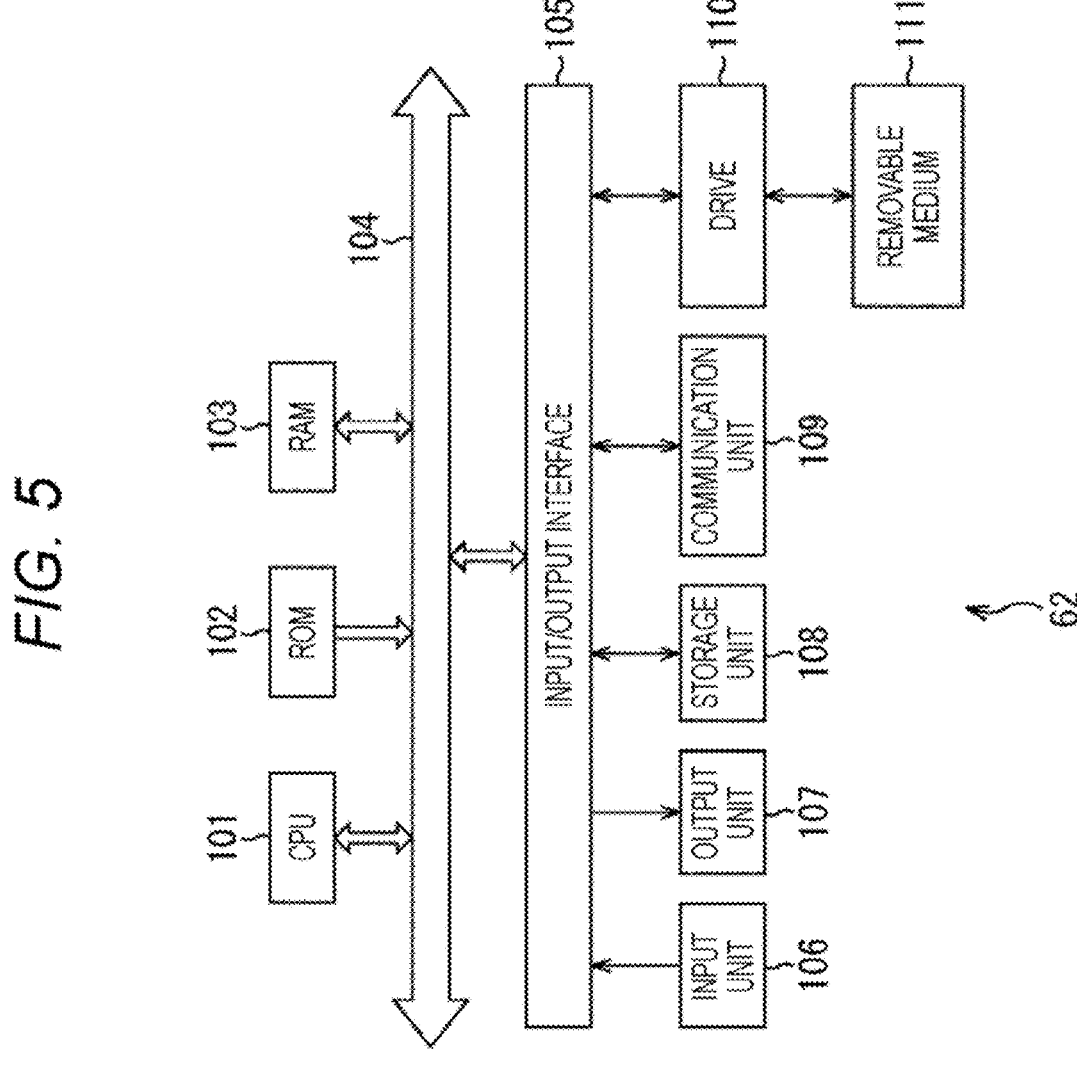
FIG. 5 is a block diagram illustrating a configuration example of hardware of a PC.

FIG. 5 is a block diagram illustrating a hardware configuration example of the PC 62 in FIG. 3.

In the PC 62 of FIG. 5, a central processing unit (CPU) 101, a read only memory (ROM) 102, and a random access memory (RAM) 103 are mutually connected by a bus 104.

The bus 104 is further connected with an input/output interface 105. An input unit 106, an output unit 107, a storage unit 108, a communication unit 109, and a drive 110 are connected to the input/output interface 105.

The input unit 106 includes a keyboard, a mouse, a microphone and the like. The output unit 107 includes a display, a speaker and the like. The storage unit 108 includes a hard disk, a non-volatile memory and the like. The communication unit 109 includes a network interface and the like. The drive 110 drives a removable medium 111 such as a magnetic disk, an optical disk, a magnetooptical disk, or a semiconductor memory.

In the PC 62 configured as described above, for example, the CPU 101 loads a program stored in the storage unit 108 into the RAM 103 via the input/output interface 105 and the bus 104 and executes the program, thereby performing various processes. For example, the CPU 101 controls the communication unit 109 to generate a control command and transmit the control command to the video wall controller 63.

The program executed by the PC 62 (CPU 101) can be provided by being recorded in the removable medium 111 as a package medium or the like, for example. Furthermore, the program can be provided via a wired or wireless transmission medium such as a local area network, the Internet, or digital satellite broadcasting.

In the PC 62, the program can be installed in the storage unit 108 via the input/output interface 105 by attaching the removable medium 111 to the drive 110. Furthermore, the program can be received by the communication unit 109 via the wired or wireless transmission medium and installed on the storage unit 108. Furthermore, the program can be installed on the ROM 102 or the storage unit 108 in advance.

<Configuration Example of Video Wall Controller>

Figure 6:
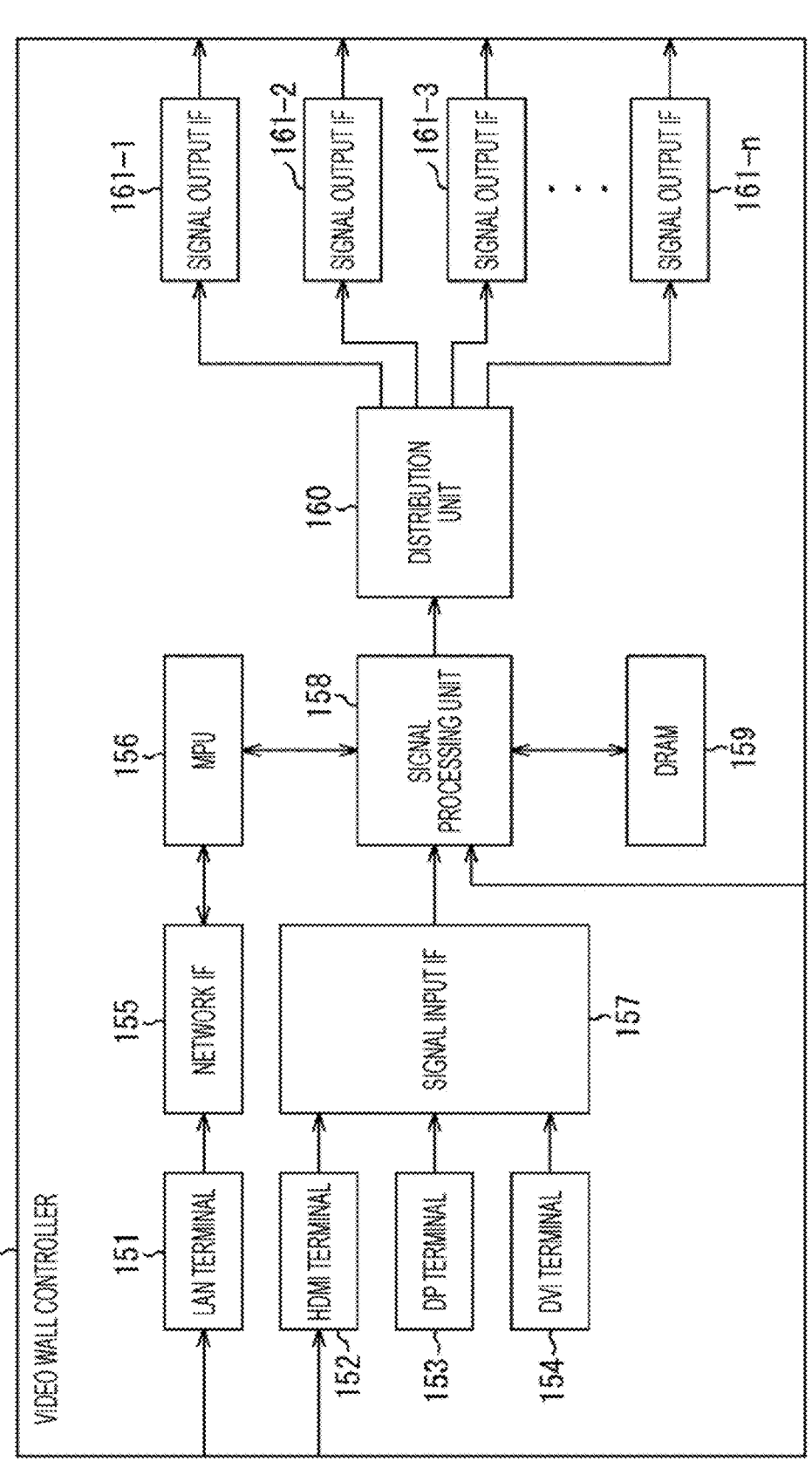
FIG. 6 is a block diagram illustrating a configuration example of a video wall controller.

FIG. 6 is a block diagram illustrating a configuration example of the video wall controller 63 of FIG. 3.

The video wall controller 63 includes a LAN terminal 151, a high definition multimedia interface (HDMI) (registered trademark) terminal 152, a display port (DP) terminal 153, a digital visual interface (DVI) terminal 154, a network interface (IF) 155, a micro processor unit (MPU) 156, a signal input IF 157, a signal processing unit 158, a dynamic random access memory (DRAM) 159, a distribution unit 160, and signal output IFs 161-1 to **161-*n***.

The LAN terminal 151 is a connection terminal of a LAN cable, and is connected to a LAN cable connected to the communication unit 109 of the PC 62. The LAN terminal 151 receives the control command via the LAN cable and supplies the control command to the MPU 156 via the network IF 155.

The MPU 156 generates a video adjustment signal instructing adjustment of a video signal in accordance with a control command supplied via the network IF 155, and supplies the video adjustment signal to the signal processing unit 158.

The HDMI terminal 152, the DP terminal 153, and the DVI terminal 154 are all input terminals of an input video signal. In the example of FIG. 6, the video server 61 and the HDMI terminal 152 are connected, and the input video signal supplied from the video server 61 is input to the HDMI terminal 152 as an input unit and acquired by the HDMI terminal 152. The input video signal input to the HDMI terminal 152 is supplied to the signal input IF 157.

Note that, in the example of FIG. 6, the video server 61 and the HDMI terminal 152 are connected, but the HDMI terminal 152, the DP terminal 153, and the DVI terminal 154 have only different standards and basically have similar functions. Therefore, any of them is selected and connected as necessary.

The signal input IF 157 converts the input video signal supplied from the HDMI terminal 152 into an input video signal of a predetermined video format, and supplies the input video signal to the signal processing unit 158.

The signal processing unit 158 performs necessary signal processing on the entire video wall 12 on the input video signal supplied via the signal input IF 157 on the basis of the video adjustment signal supplied from the MPU 156 while exchanging data with the DRAM 159 as necessary. Specifically, the signal processing unit 158 adjusts color temperature, contrast, brightness, and the like of the input video signal on the basis of the video adjustment signal. The signal processing unit 158 performs output video signal generation processing on the adjusted input video signal on the basis of the genlock signal input from the clock generator 64. The signal processing unit 158 supplies the output video signal generated on the basis of the output video signal generation processing to the distribution unit 160.

The distribution unit 160 distributes the output video signal supplied from the signal processing unit 158 to the signal output IFs 161-1 to **161-*n* connected to the display units 41-1 to 41-*n*, respectively. Specifically, the distribution unit 160 (division unit) divides the output video signal into n pieces according to the position of each display unit 41, and sets the divided output video signal as the output video signal to be displayed on each display unit 41. Then, the distribution unit 160 supplies an output video signal to be displayed on each display unit 41 to any one of the signal output IFs 161-1 to 161-*n* connected to the display unit 41. Note that, hereinafter, in a case where it is not necessary to distinguish the signal output IFs 161-1 to 161-*n* individually, they are simply referred to as a signal output IF 161**.

The signal output IF 161 (output unit) transmits (outputs) the output video signal supplied from the distribution unit 160 to the display unit 41 connected to itself by a LAN cable or the like. The transmission medium for this transmission may be wireless.

Note that, here, it is assumed that the control command is automatically transmitted from the PC 62, but may be transmitted in response to a request from the video wall controller 63.

<Detailed Configuration Example of Display Unit>

Figure 7:
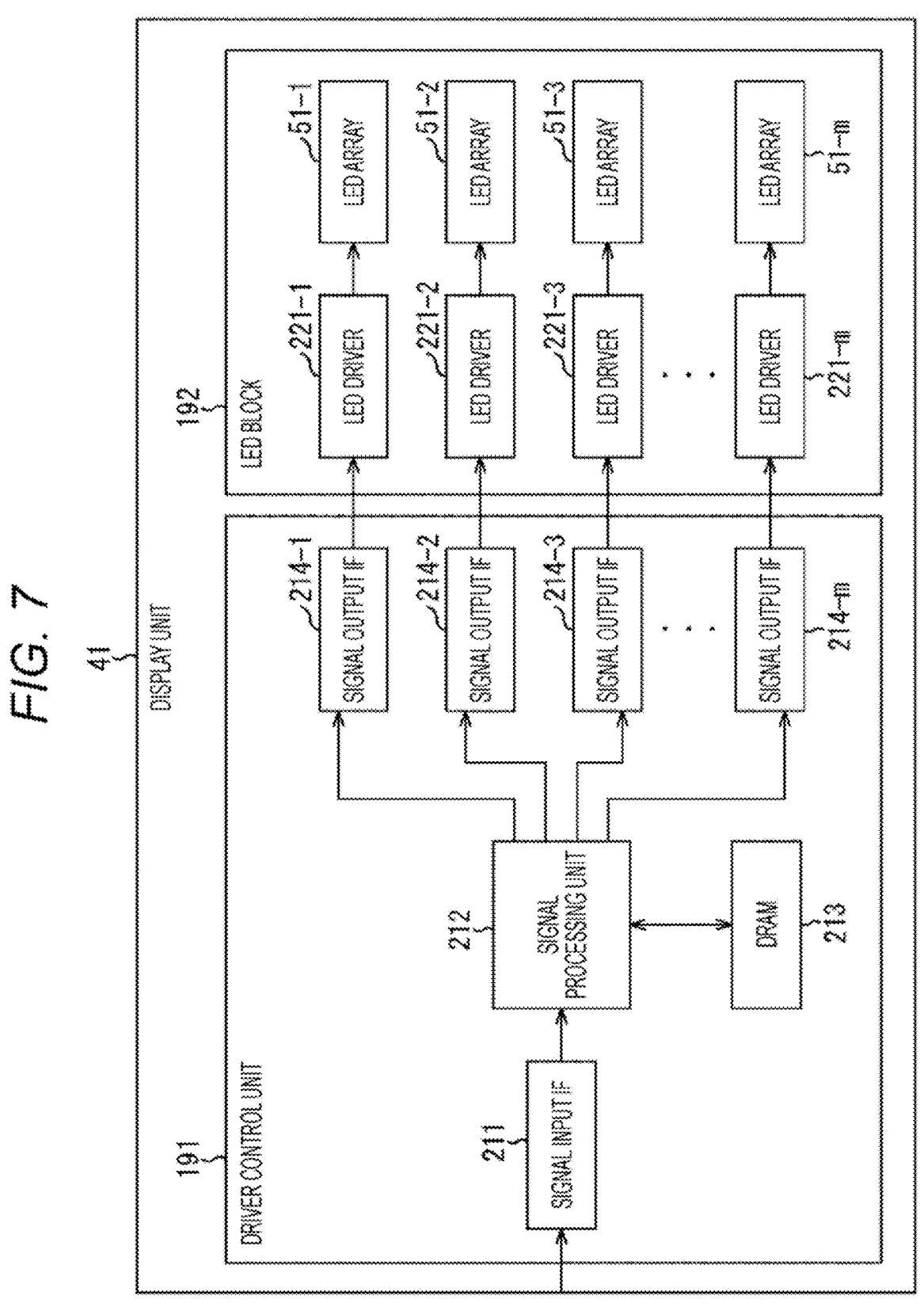
FIG. 7 is a block diagram illustrating a detailed configuration example of a display unit.

FIG. 7 is a block diagram illustrating a detailed configuration example of the display unit 41 in FIG. 3.

As illustrated in FIG. 7, the display unit 41 includes a driver control unit 191 and an LED block 192.

The driver control unit 191 includes a signal input IF 211, a signal processing unit 212, a DRAM 213, and signal output IFs 214-1 to **214-*m***.

The signal input IF 211 receives the output video signal transmitted from the video wall controller 63, and supplies the output video signal to the signal processing unit 212.

While exchanging data with the DRAM 213 as necessary, the signal processing unit 212 individually performs signal processing necessary for its own display unit 41 on the output video signal supplied from the signal input IF 211. Specifically, the signal processing unit 212 corrects the color and luminance necessary for its own display unit 41 using a color matrix look up table (LUT) or the like stored in the DRAM 213 with respect to the output video signal. The signal processing unit 212 divides the output video signal after the signal processing into m pieces according to the position of each LED array 51 on its own display unit 41.

For each LED array 51, the signal processing unit 212 generates a display signal for setting the light emission intensity of each LED constituting the LED array 51 on the basis of the divided output video signal in units of frames.

The signal output IFs 214-1 to **214-*m* respectively corresponding to the LED arrays 51-1 to 51-*m* are connected to the signal processing unit 212. Note that, hereinafter, in a case where it is not necessary to distinguish the signal output IFs 214-1 to 214-*m* individually, they are simply referred to as a signal output IF 214. The signal processing unit 212 supplies the display signal of the output frame rate generated for each LED array 51 to the signal output IF 214 corresponding to the LED array 51**.

The signal output IF 214 transmits the display signal of the output frame rate supplied from the signal processing unit 212 to the LED block 192.

The LED block 192 includes LED drivers 221-1 to 221-$m$ and LED arrays 51-1 to 51-$m$.

The LED drivers 221-1 to 221-$m$ are connected to the signal output IFs 214-1 to 214-$m$ of the driver control unit 191, respectively, and are connected to the LED arrays 51-1 to 51-$m$, respectively. Note that, hereinafter, in a case where it is not necessary to distinguish the LED drivers 221-1 to 221-$m$ individually, they are simply referred to as an LED driver 221.

The LED driver 221 (display control unit) drives each LED 241 by performing pulse width modulation (PWM) control of light emission of each LED constituting the LED array 51 connected to the LED driver 221 on the basis of the output frame rate display signal transmitted from the signal output IF 214 connected to the LED driver 221. Specifically, the LED driver 221 generates a PWM signal, which is a digital signal, so that each LED 241 of the LED array 51 emits light with an intensity based on the display signal corresponding to the LED 241, and supplies the PWM signal to each LED 241. As a result, the video corresponding to the position of the LED array 51 on the video wall 12 among the video of the output frame rate corresponding to the output video signal output from the video wall controller 63 is displayed on the LED array 51 in synchronization with the genlock signal.

<Configuration Example of LED Array>

Figure 8:
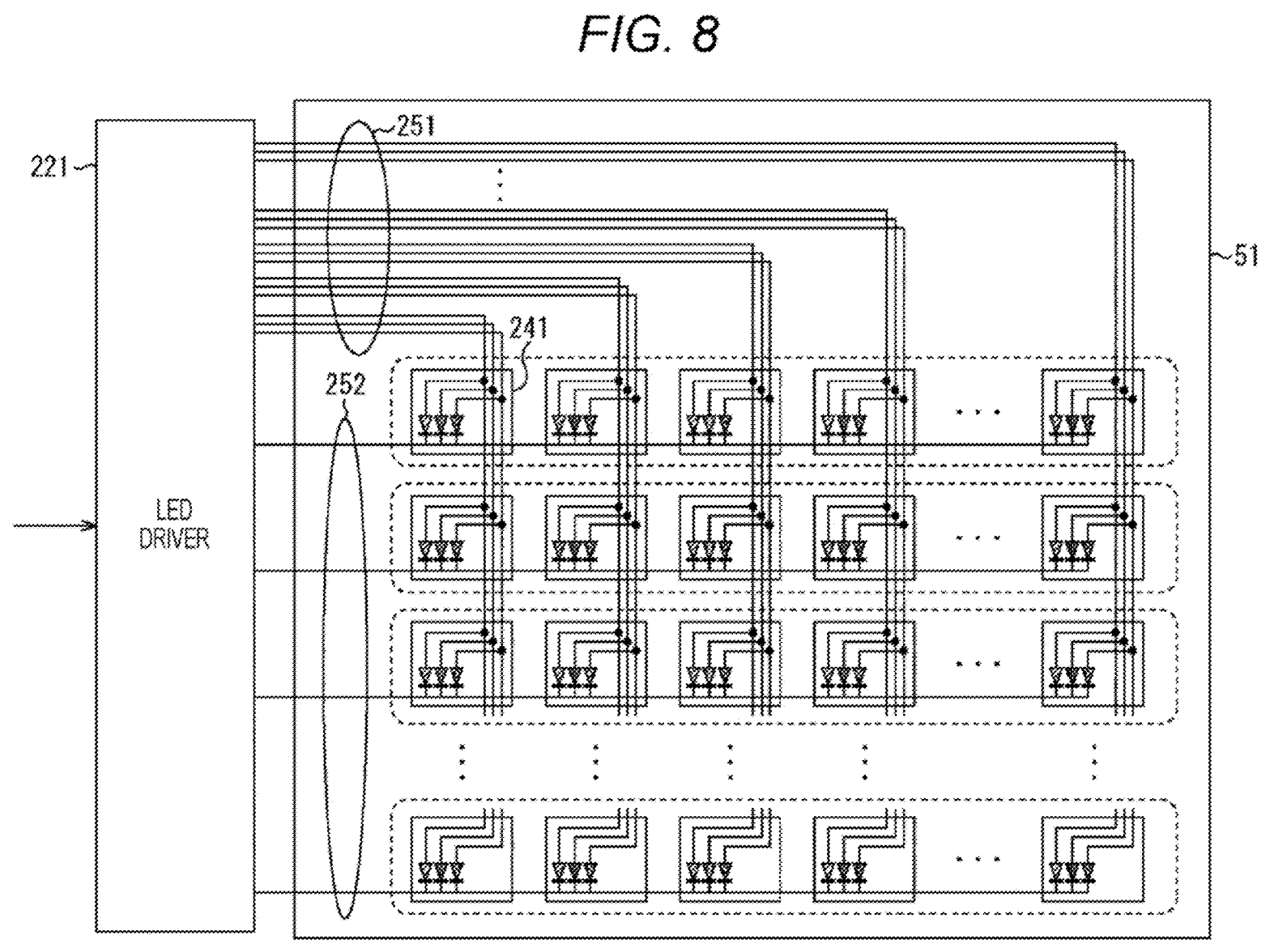

FIG. 8 is a diagram illustrating a configuration example of the LED array 51.

As illustrated in FIG. 8, light emission of the LED array 51 is controlled by a passive matrix drive system.

Specifically, the LED array 51 includes p×p (p is a positive integer) LEDs 241, a luminance control line (Sig line) 251, and a row selection line (Scan line) 252. The LED 241 is a common cathode type LED. The p×p LEDs 241 are arranged in a matrix in which p LEDs are arranged in the row direction (vertical direction) and p LEDs are arranged in the column direction (horizontal direction). In the example of FIG. 8, the number of LEDs 241 in the row direction and the number of LEDs in the column direction are the same p, but the number of LEDs 241 in the row direction and the number of LEDs in the column direction may be different.

The luminance control line 251 is provided for each column of the LEDs 241, and the same luminance control line 251 is connected to the LEDs 241 in each column. The row selection line 252 is provided for each row of the LEDs 241, and the same row selection line 252 is connected to the LEDs 241 in each row.

The LED driver 221 controls the light emission timing of the LED 241 of each row such that the LED 241 emits light row by row sequentially from the upper row at a predetermined light emission cycle. Specifically, the LED driver 221 applies a predetermined fixed potential to the row selection line 252 corresponding to each row at the light emission timing of the LED 241 of each row. Note that the predetermined fixed potential is generally a GND potential (0 V potential), but is not limited thereto.

The LED driver 221 also inputs the PWM signal of each LED 241 of the row to the luminance control line 251 corresponding to the column of the LED 241 at the light emission timing of the LED 241 of each row on the basis of the display signal supplied from the signal output IF 214.

As described above, in the LED array 51, at the light emission timing of the LEDs 241 of each row, each LED 241 of the each row emits light of luminance based on the display signal of the LED 241. As a result, in the LED array 51, the video corresponding to the output video signal is displayed row by row in order from the upper row, and the video is refreshed (updated) every light emission cycle. The display (light emission) frame rate of the video is an output frame rate.

<Description of Output Video Signal Generation Processing>

Figure 9:
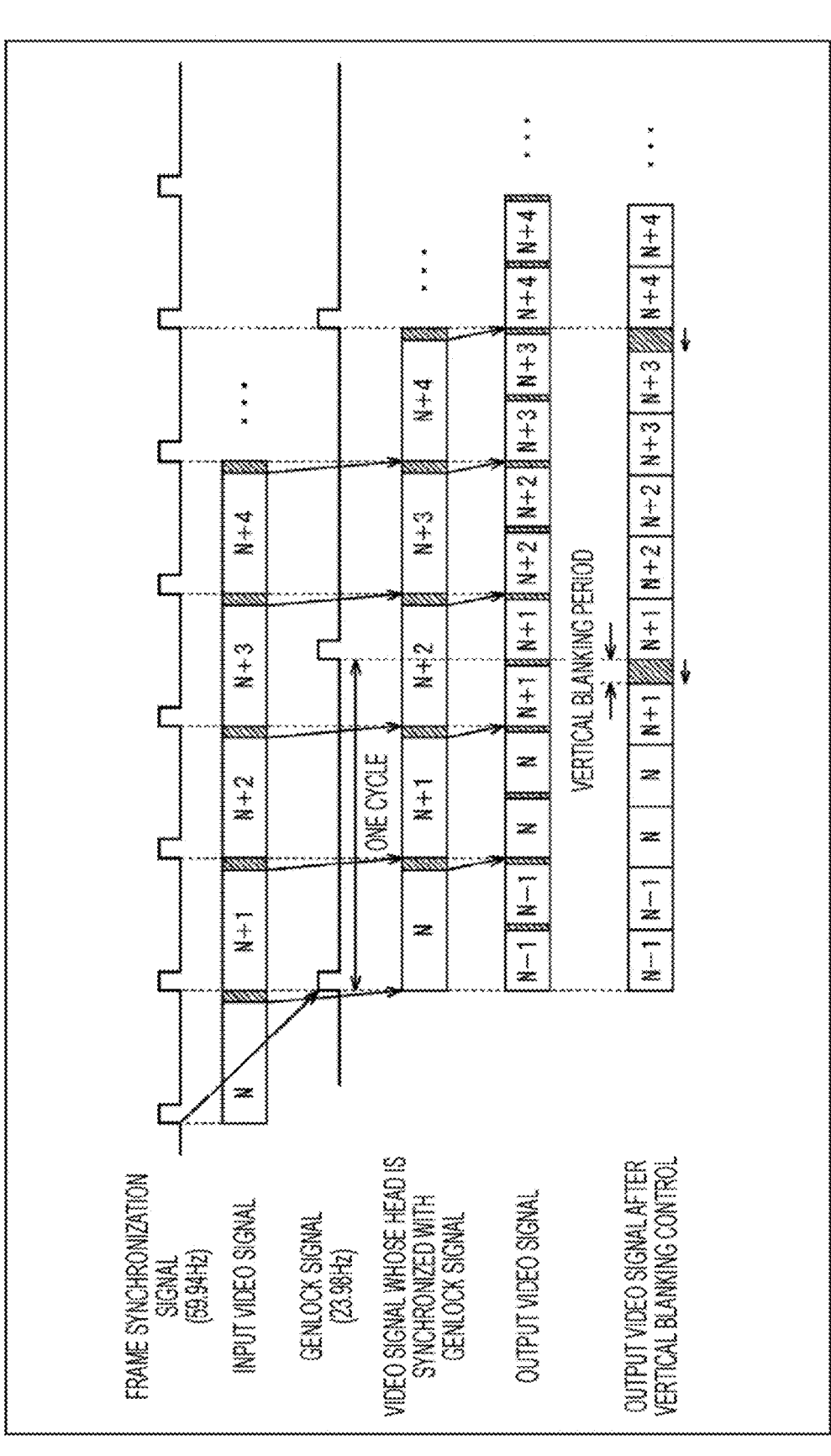
FIG. 9 is a diagram illustrating a timing chart for explaining output video signal generation processing.

FIG. 9 is a diagram illustrating a timing chart for explaining the output video signal generation processing by the signal processing unit 158 in FIG. 6.

In FIG. 9, the horizontal axis represents time. In the example of FIG. 9, the output frame rate is 119.88 (120) fps that is twice the input frame rate.

As illustrated in the first row from the top in FIG. 9, the frequency of the frame synchronization signal input to the video server 61 is 59.94 Hz that is the same as the input frame rate. As illustrated in the second stage from the top in FIG. 9, the input video signal input to the signal processing unit 158 is a frame-based signal synchronized with the frame synchronization signal. The frame-based signal is configured by providing a vertical blanking period after a section of a signal indicating luminance or color in units of frames.

Note that, in FIG. 9, a number and an alphabet attached to a rectangle indicating a section of a signal indicating luminance and color in units of frames indicate the number of input frames from the head of a frame (hereinafter, referred to as an input frame) of the input video signal corresponding to the section. For example, the first input frame of the input video signal in the second row from the top in FIG. 9 is an Nth (N is an integer of 0 or more) input frame. Furthermore, in FIG. 9, the rectangle representing the vertical blanking period is shaded. These are similar in FIGS. 14 and 17 described later.

As illustrated in the third stage from the top in FIG. 9, the frequency of the genlock signal input to the signal processing unit 158 is 23.98 Hz. When the genlock signal is input, signal processing unit 158 synchronizes the head of the Nth input frame of the input video signal in the second stage from the top in FIG. 9 with the genlock signal. The video signal obtained as a result is as illustrated in the fourth stage from the top in FIG. 9.

Next, the signal processing unit 158 performs double speed processing on the video signals illustrated in the fourth stage from the top of FIG. 9 by multiplying the frame rate of the video signals by an integral number (in the example of FIG. 9, twice) and combining the video signals, thereby generating output video signals illustrated in the fifth stage from the top of FIG. 9.

In the example of FIG. 9, since the output frame rate is 119.88 fps, the output video signal includes a video signal of an output frame rate of 5 (=119.88/23.98) frames during one cycle of the genlock signal. For example, the output video signal illustrated in the fifth stage from the top of FIG. 9 includes the video signal of the (N−1)th input frame of the output frame rate twice, the video signal of the Nth input frame twice, and the video signal of the (N+1)th input frame once in the head cycle of the genlock signal. In the second cycle of the genlock signal, the output video signal includes the video signal of the (N+1)th input frame of the output frame rate once, the video signal of the (N+2)th input frame twice, and the video signal of the (N+3)th input frame twice.

As described above, the video signal of the consecutive (N+1)th input frame spans the head cycle and the second cycle of the genlock signal.

Next, the signal processing unit 158 controls the vertical blanking period of the output video signal illustrated in the fifth stage from the top of FIG. 9, and moves the vertical blanking period of each frame included in one cycle of the genlock signal after the last frame included in one cycle of the genlock signal in the output video signal. As a result, in the output video signal illustrated in the fifth stage from the top of FIG. 9, the vertical blanking periods for five frames included in the head cycle of the genlock signal are collectively provided after the sections of the signals representing the luminance and color of the (N+1)th input frame, which is the last frame included in the cycle. This similarly applies to other cycles of the genlock signal. The output video signal obtained as a result is as illustrated in the sixth stage from the top in FIG. 9.

The output video signal after the vertical blanking control illustrated in the sixth stage from the top in FIG. 9 generated as described above is transmitted to the display unit 41 via the distribution unit 160 and the signal output IF 161. As a result, the video at the output frame rate is displayed on the display unit 41 in synchronization with the genlock signal.

In the example of FIG. 9, the signal processing unit 158 performs the double speed processing on the synchronized video signal after synchronizing the input video signal with the genlock signal, but may perform the double speed processing on the input video signal and then synchronize the video signal after the double speed processing with the genlock signal.

Note that, in the example of FIG. 9, the output frame rate is set to twice the input frame rate, but is not limited thereto, and may be the same as or different from the input frame rate. The output frame rate is set to, for example, an integral multiple of the input frame rate. Furthermore, in a case where the input frame rate itself is an integral multiple of the frequency of the genlock signal, that is, in a case where the input video signal can be synchronized with the genlock signal without performing double speed processing, the signal processing unit 158 may not perform double speed processing on the input video signal.

<Effect of Control of Vertical Blanking Period>

Figure 10:
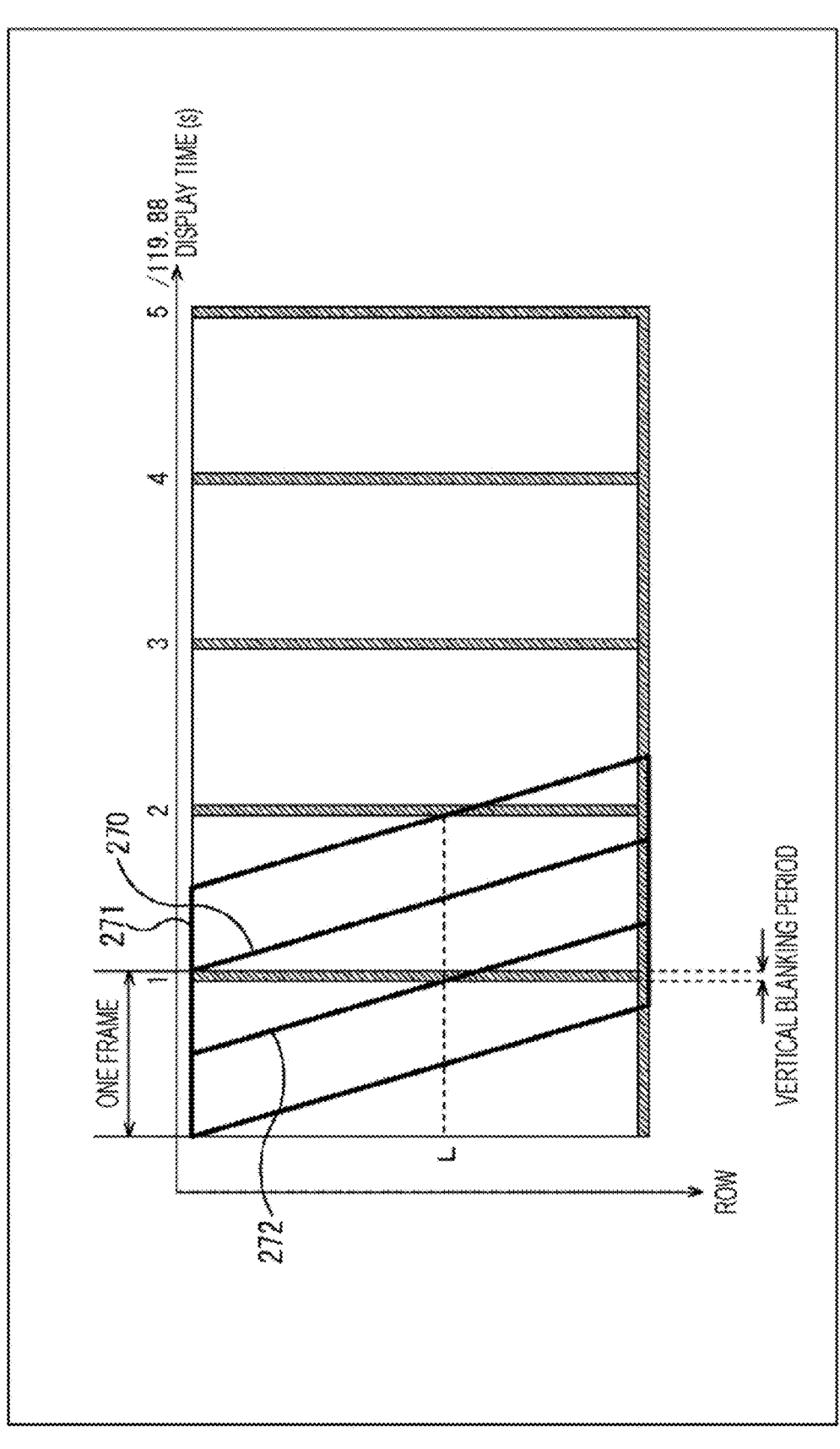
FIG. 10 is a diagram for explaining a cause of occurrence of black belts.
Figure 11:
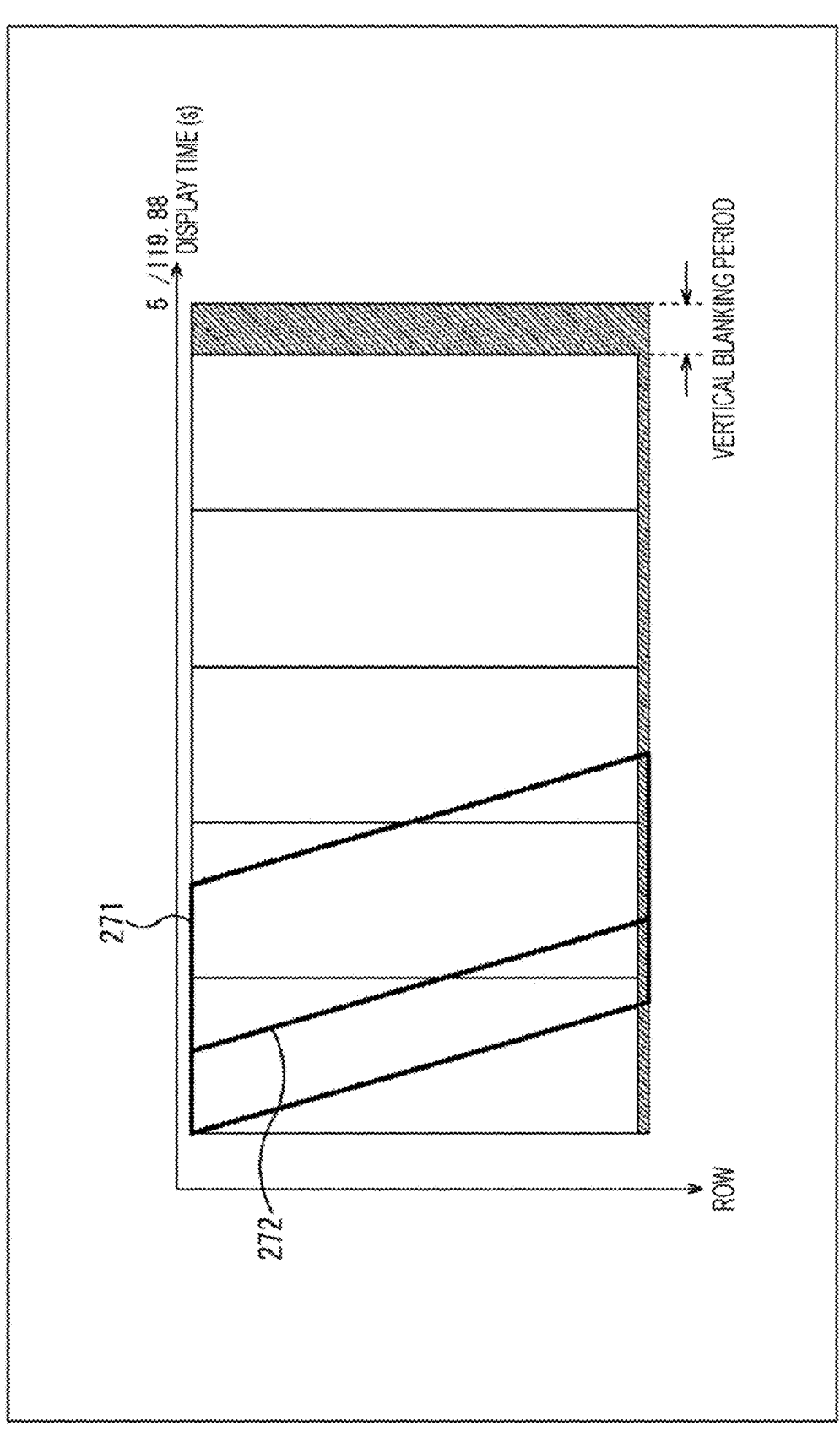
FIG. 11 is a diagram for explaining an effect of control of a vertical blanking period.

FIGS. 10 and 11 are diagrams for explaining the effect of the control of the vertical blanking period by the signal processing unit 158.

First, in FIG. 10, a cause of occurrence of a black belt in a video re-imaged by a re-imaging system in a case where a vertical blanking period of an output video signal is not controlled will be described.

In FIG. 10, the horizontal axis represents the display time of the video displayed on the video wall, and the vertical axis represents the number of rows from the top of the row of pixels on the light receiving surface of the imaging unit corresponding to the video displayed at the display time. In the example of FIG. 10, the output frame rate is 119.88 fps that is twice the input frame rate. Therefore, the number of frames of the video displayed on the video wall included in one cycle of the genlock signal is five frames. In FIG. 10, a display period of a video for five frames displayed in an imaging period of one frame is represented by a rectangle, and a hatched portion of the rectangle represents a vertical blanking period. These are similar in FIG. 11 described later.

Since the imaging unit performs imaging by the rolling shutter system, the exposure by the light of the LED of each row is sequentially performed from the upper row, and the exposure start timing of each row is different. Furthermore, since display and imaging are synchronized by the genlock signal, the exposure start time for each frame and the display start time for each five frames are synchronized. Therefore, in FIG. 10, in the exposure period of one frame, the upper left vertex coincides with the upper left vertex of the rectangle representing the display period of the video for five frames, and the length of the side in the lateral direction can be represented by a parallelogram corresponding to the exposure time.

For example, in a case where the exposure period is represented by a parallelogram 270 in FIG. 10, the vertical blanking period is included once in the exposure period in all rows of the light receiving surface of the imaging unit 85.

However, in a case where the exposure period is represented by the parallelogram 271, the vertical blanking period is included once in the exposure period in the row above the L-th row of the light receiving surface of the imaging unit, but the vertical blanking period is included twice in the exposure period in the row below the L-th row. Furthermore, in a case where the exposure period is represented by the parallelogram 272, the vertical blanking period is not included in the exposure period in the rows above the L-th row of the light receiving surface of the imaging unit, but the vertical blanking period is included once in the exposure period in the rows below the L-th row.

Here, light emission is not performed in the vertical blanking period. Therefore, in a case where the exposure period is represented by the parallelograms 271 and 272, the luminance of the pixels in the lower row of the Lth row re-imaged by the video camera is lower than the luminance of the pixels in the upper row of the Lth row. As a result, in the video re-imaged by the video camera, the video in the lower rows relative to the L-th row is a black belt. The black belt is a band-shaped region having lower luminance than other regions, and the color of the black belt is black of various concentrations. As described above, in a case where the output blanking period of the output video signal is not controlled, the black belt may occur depending on the exposure time.

On the other hand, the signal processing unit 158 controls the vertical blanking period so as to move the vertical blanking period of each frame included in one cycle of the genlock signal, that is, the imaging period of one frame after the last frame. Therefore, as illustrated in FIG. 11, the vertical blanking period is provided only for the video of the last frame among the videos of five frames displayed in the imaging period of one frame. Therefore, the vertical blanking period is not included in the exposure period in all rows of the light receiving surface of the imaging unit 85 regardless of the exposure time. For example, even in a case where the exposure period is represented by the parallelograms 271 and 272, the vertical blanking period is not included in the exposure period in all rows of the light receiving surface of the imaging unit 85. Therefore, the occurrence of the black belt can be prevented.

Here, the occurrence of black belts has been described, but similarly it is also possible to prevent the occurrence of other artifacts such as stripes.

<Description of Processing of Video Wall Controller>

FIG. 12 is a flowchart illustrating a video signal process of the video wall controller 63 of FIG. 6. This video signal process is started, for example, when an input video signal is transmitted from the video server 61 in FIG. 3.

In step S51 of FIG. 12, the signal input IF 157 of the video wall controller 63 receives the input video signal transmitted from the video server 61 via the HDMI terminal 152.

In step S52, the signal input IF 157 converts the input video signal received by the processing in step S51 into an input video signal of a predetermined video format, and supplies the input video signal to the signal processing unit 158.

In step S53, the MPU 156 generates the video adjustment signal according to the control command acquired from the communication unit 109 of the PC 62 through the LAN terminal 151 and the network IF 155, and supplies the video adjustment signal to the signal processing unit 158.

In step S54, the signal processing unit 158 adjusts the color temperature, contrast, brightness, and the like of the input video signal supplied by the processing in step S 52 on the basis of the video adjustment signal while exchanging data with the DRAM 159 as necessary.

In step S55, on the basis of the genlock signal input from the clock generator 64, the signal processing unit 158 performs output video signal generation processing on the adjusted input video signal obtained by the processing in step S54. The signal processing unit 158 supplies the output video signal obtained as a result of the output video signal generation processing to the distribution unit 160.

In step S56, the distribution unit 160 distributes the output video signal supplied by the processing in step S55 to each signal output IF 161.

In step S57, each signal output IF 161 transmits the output video signal supplied by the processing in step S56 to the display unit 41 connected to itself. Then, the video signal process ends.

As described above, the video wall controller 63 of the re-imaging system 10 can perform processing on the input video signal of the input frame rate different from the frequency of the genlock signal on the basis of the genlock signal. For example, the video wall controller 63 can perform, on the basis of the genlock signal, output video signal generation processing of generating an output video signal of an output frame rate synchronized with the genlock signal for an input video signal of an input frame rate different from the frequency of the genlock signal.

Therefore, the video wall controller 63 can display the video of the output frame rate synchronized with the genlock signal on the video wall 12 on the basis of the input video signal of the input frame rate different from the frequency of the genlock signal. As a result, the video wall 12 can display video at an output frame rate that is synchronized with the imaging frame rate of the video camera 11 and is higher than the imaging frame rate of the video camera 11, for example. As a result, the latency of the video displayed on the video wall 12, which is recognized by the performer in the re-imaging environment, can be reduced.

Note that, in the re-imaging system 10, the video camera 11 and the PC 62 may exchange signals via a wire such as a coaxial cable, or may exchange signals by wireless communication. Furthermore, the PC 62 and the video wall controller 63 may exchange signals via a wire such as a LAN cable, or may exchange signals by wireless communication.

The re-imaging system 10 may be provided with a plurality of video wall controllers 63 such that each video wall controller 63 divides and controls the video wall 12.

<A Case where Video Wall Controller Cannot Perform Processing on Video Signal of Frame Rate Different from Frequency of Genlock Signal on the Basis of Genlock Signal>

<Example of Re-Imaging System>

Figure 13:
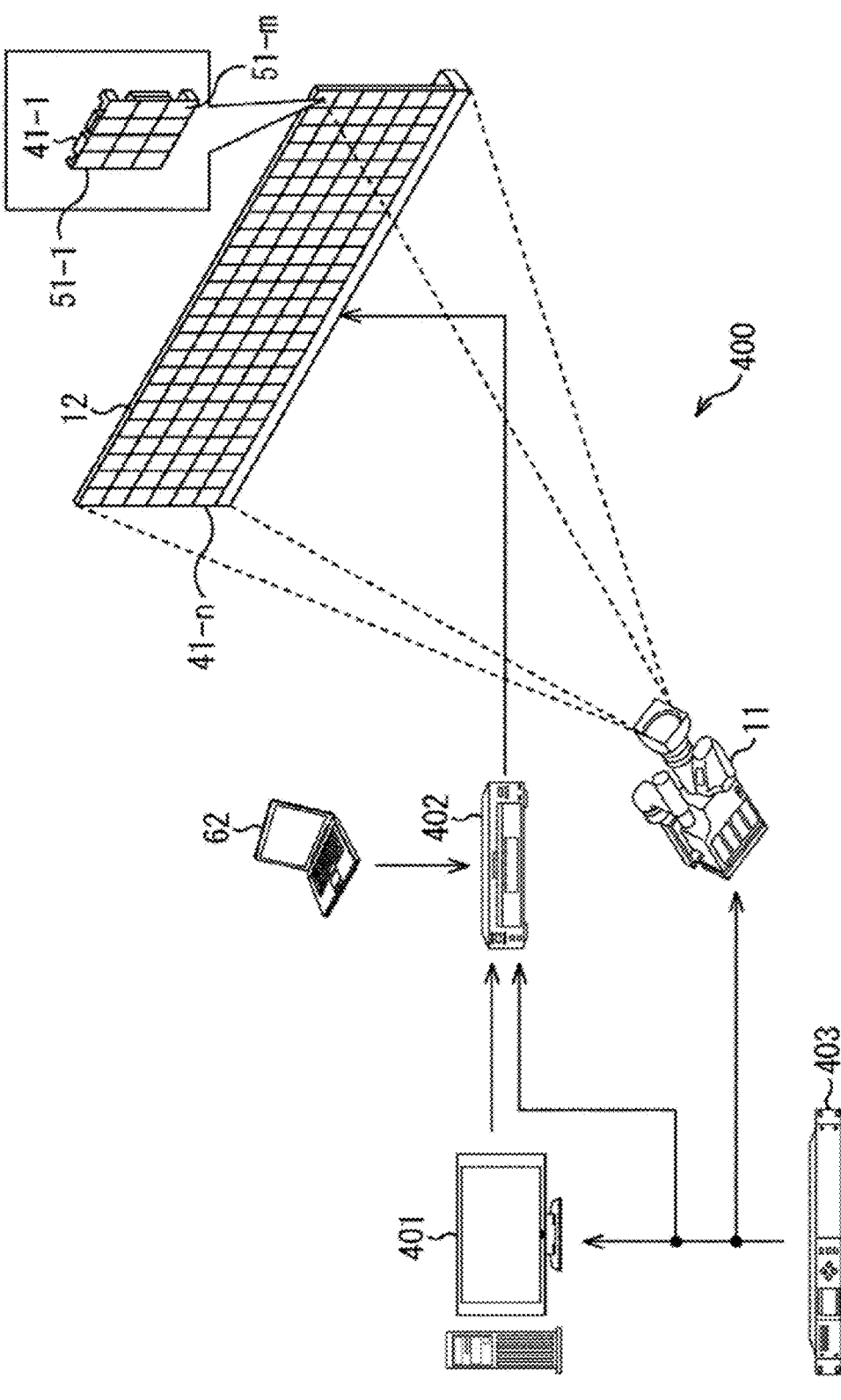
FIG. 13 is a diagram illustrating an example of the re-imaging system.

FIG. 13 is a diagram illustrating an example of the re-imaging system in a case where the video wall controller cannot perform processing on the video signal of the frame rate different from the frequency of the genlock signal on the basis of the genlock signal.

In the re-imaging system 400 of FIG. 13, components corresponding to those of the re-imaging system 10 of FIG. 3 are denoted by the same reference sign. Therefore, description of the components will be appropriately omitted, and description will be given focusing on a component different from that of the re-imaging system 10.

A re-imaging system 400 in FIG. 13 is different from the re-imaging system 10 in that the video server 61, the video wall controller 63, and the clock generator 64 are replaced with a video server 401, a video wall controller 402, and a clock generator 403, and is otherwise configured similarly to the re-imaging system 10.

In the re-imaging system 400, the video wall controller 402 cannot perform processing on a video signal of a frame rate different from the frequency of the genlock signal on the basis of the genlock signal. Therefore, a video signal having the same frame rate as the frequency of the genlock signal is supplied from the video server 401 to the video wall controller 402.

Specifically, the video server 401 is different from the video server 61 in that a genlock signal is input as a frame synchronization signal from the clock generator 403 and that a frame rate of a stored video signal is the same as a frequency of the genlock signal, and other configurations are similar to those of the video server 61.

The video wall controller 402 is different from the video wall controller 63 in that a signal processing unit outputs a video signal having the same frame rate as the frequency of the genlock signal input from the video server 401 in synchronization with the genlock signal on the basis of the genlock signal, and is configured in a similar manner as the video wall controller 63 except for this.

The clock generator 403 generates and outputs a genlock signal to the video camera 11, the video server 401, and the video wall controller 402.

<Description of Processing of Signal Processing Unit>

Figure 14:
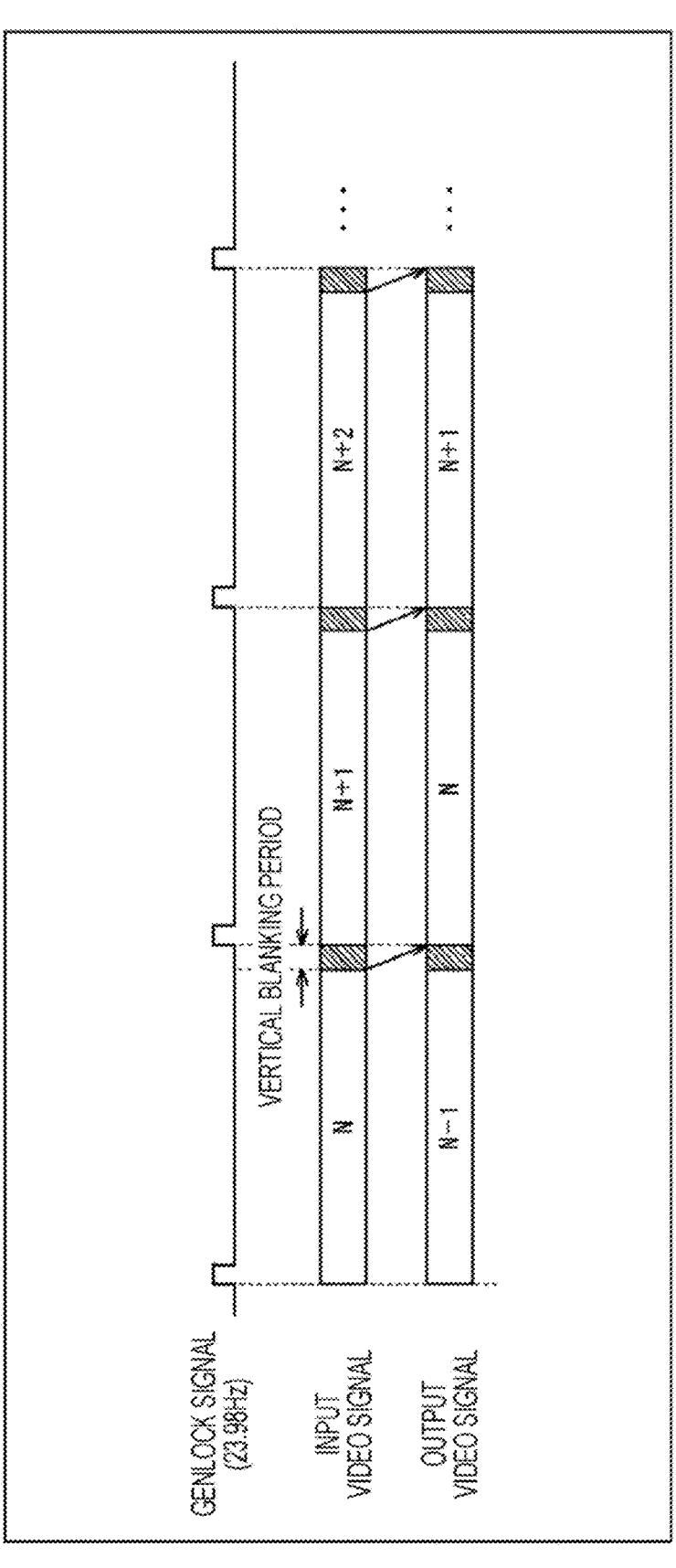
FIG. 14 is a diagram illustrating a timing chart for explaining processing by a video wall controller in FIG. 13.

FIG. 14 is a diagram illustrating a timing chart for explaining processing by the signal processing unit of the video wall controller 402 in FIG. 13.

In FIG. 14, the horizontal axis represents time.

As illustrated in the first stage from the top of FIG. 14, the frequency of the genlock signal input to the video server 401 and the video wall controller 402 is 23.98 Hz. As illustrated in the second stage from the top of FIG. 14, the video signal input to the signal processing unit of the video wall controller 402 is a frame-based signal synchronized with the genlock signal. The frame-based signal is configured by providing a vertical blanking period after a section of a signal indicating luminance or color in units of frames.

When the video signal illustrated in the second stage from the top in FIG. 14 is input, the signal processing unit outputs the video signal in synchronization with the genlock signal on the basis of the genlock signal illustrated in the first stage from the top in FIG. 14. Therefore, the output video signal is as illustrated in the third stage from the top in FIG. 14.

As described above, the signal processing unit of the video wall controller 402 can output the video signal of the same frame rate as the frequency of the input genlock signal in synchronization with the genlock signal. As a result, the video camera 11 can re-image the video displayed on the video wall 12 at the same frame rate as the frame rate of the re-imaged video in synchronization with the display of the video wall 12.

However, since the frame rate of the video displayed on the video wall 12 is the same as the imaging frame rate, the latency of the video displayed on the video wall 12 cannot be reduced in the re-imaging environment.

<Another Example of Re-Imaging System>

Figure 15:
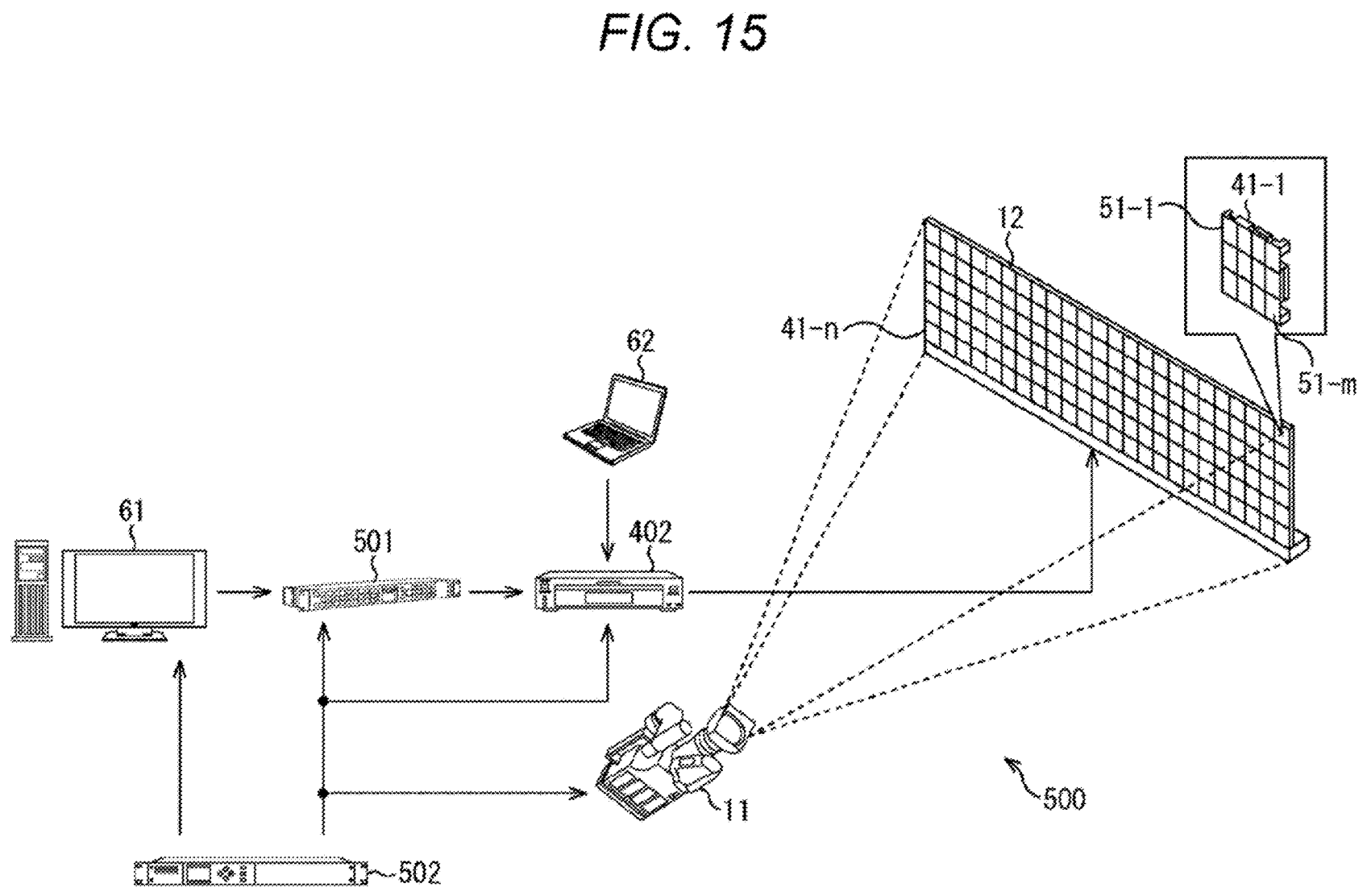

FIG. 15 is a diagram illustrating another example of the re-imaging system in a case where the video wall controller cannot perform processing on the video signal of the frame rate different from the frequency of the genlock signal on the basis of the genlock signal.

In the re-imaging system 500 of FIG. 15, the same reference signs are assigned to components corresponding to the re-imaging system 10 of FIG. 3 and the re-imaging system 400 of FIG. 13. Therefore, description of the components will be omitted as appropriate, and description will be given focusing on a component different from the re-imaging system 10 and the re-imaging system 400.

A re-imaging system 500 in FIG. 15 is different from the re-imaging system 10 in that a frame rate controller 501 is newly provided and that the video wall controller 63 and the clock generator 64 are replaced with a video wall controller 402 and a clock generator 502, and is configured in a similar manner as the re-imaging system 10 except for this point.

In the re-imaging system 500, the video wall controller 402 cannot perform processing on a video signal of a frame rate different from the frequency of the genlock signal on the basis of the genlock signal. Therefore, the input frame rate of the input video signal output from the video server 61 is converted into the same frame rate as the frequency of the genlock signal by the frame rate controller 501, and is input to the video wall controller 402.

Specifically, the input video signal of the input frame rate output from the video server 61 in synchronization with the frame synchronization signal is input to the frame rate controller 501. The frame rate controller 501 also receives a genlock signal from the clock generator 502. On the basis of the genlock signal, the frame rate controller 501 converts the frame rate of the input video signal input in synchronization with the frame synchronization signal into a video signal having the same frame rate as the frequency of the genlock signal, and supplies the video signal to the video wall controller 402 in synchronization with the genlock signal.

The clock generator 502 generates and outputs a genlock signal to the video camera 11, the video wall controller 402, and the frame rate controller 501. Furthermore, the clock generator 502 generates a frame synchronization signal whose start timing is synchronized with the genlock signal, and outputs the frame synchronization signal to the video server 61.

In the re-imaging system 500 as described above, similarly to the re-imaging system 400, the video camera 11 can re-image the video displayed on the video wall 12 at the same frame rate as the frame rate of the re-imaged video in synchronization with the display of the video wall 12. However, since the frame rate of the video displayed on the video wall 12 is the same as the imaging frame rate, the latency of the video displayed on the video wall 12 cannot be reduced in the re-imaging environment.

<Still Another Example of Re-Imaging System>

Figure 16:
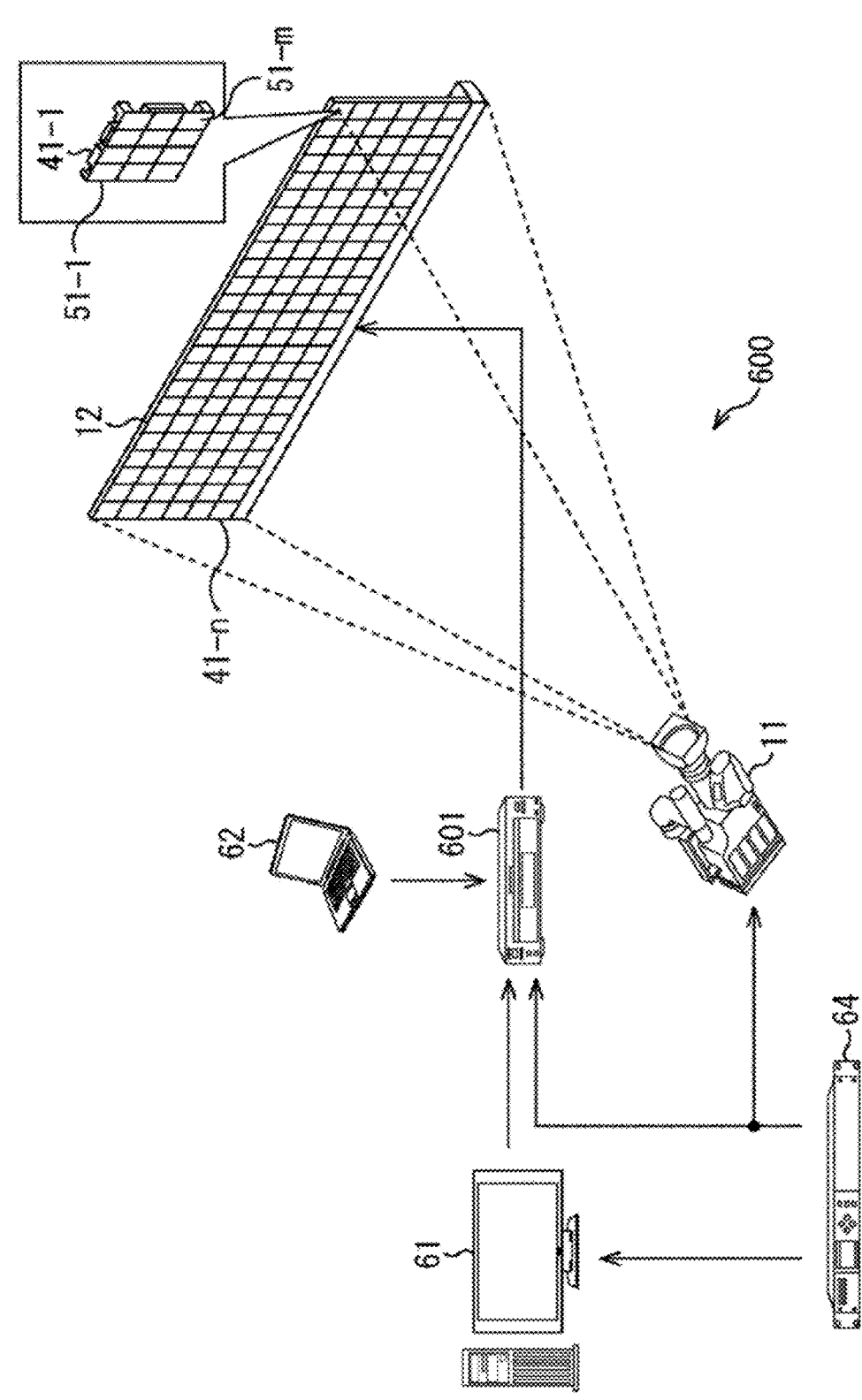
FIG. 16 is a diagram illustrating still another example of the re-imaging system.

FIG. 16 is a diagram illustrating still another example of the re-imaging system in a case where the video wall controller cannot perform processing on the video signal of the frame rate different from the frequency of the genlock signal on the basis of the genlock signal.

In a re-imaging system 600 of FIG. 16, components corresponding to those of the re-imaging system 10 of FIG. 3 are denoted by the same reference signs. Therefore, description of the components will be appropriately omitted, and description will be given focusing on a component different from that of the re-imaging system 10.

The re-imaging system 600 in FIG. 16 is different from the re-imaging system 10 in that the video wall controller 63 is replaced with a video wall controller 601, and is configured in a similar manner as the re-imaging system 10 except for this point.

In the re-imaging system 600, the video wall controller 601 cannot perform processing on a video signal of a frame rate different from the frequency of the genlock signal on the basis of the genlock signal. Therefore, the video wall controller 601 generates a video signal of an output frame rate synchronized with the frame synchronization signal, ignoring the genlock signal.

Specifically, the video wall controller 601 is different from the video wall controller 63 in that a signal processing unit generates a video signal of an output frame rate synchronized with a frame synchronization signal from an input video signal input from the video server 61 while ignoring a genlock signal, and is configured in a similar manner as the video wall controller 63 except for this point.

<Description of Processing of Signal Processing Unit>

Figure 17:
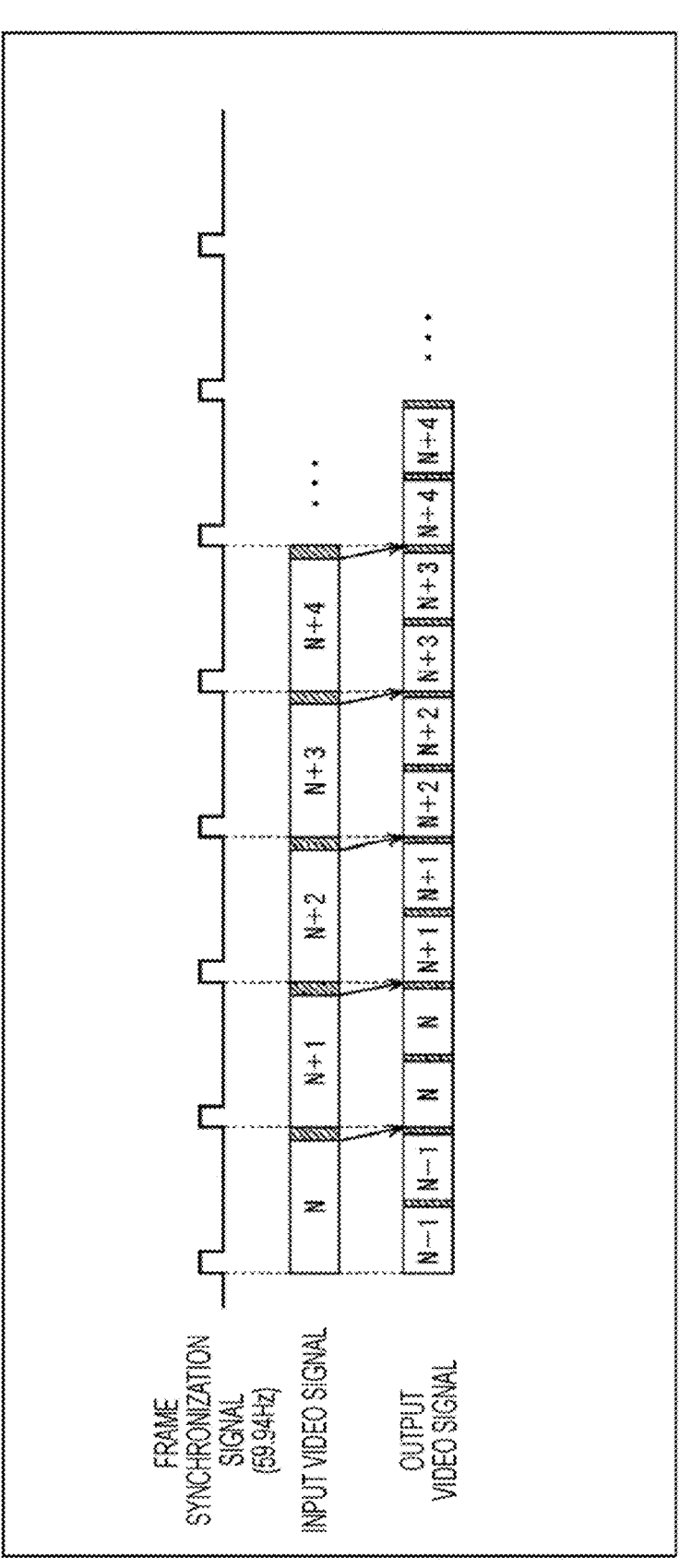
FIG. 17 is a diagram illustrating a timing chart for explaining processing by a video wall controller in FIG. 16.

FIG. 17 is a diagram illustrating a timing chart for explaining processing by the signal processing unit of the video wall controller 601 in FIG. 16.

In FIG. 17, the horizontal axis represents time. In the example of FIG. 17, the input frame rate is 59.94 fps different from the frequency of the genlock signal, and the output frame rate is 119.88 fps that is twice the input frame rate.

The first and second stages from the top in FIG. 17 are similar to the first and second stages from the top in FIG. 9, and thus the description thereof is omitted. Since the input frame rate of the input video signal is different from the frequency of the genlock signal, the signal processing unit of the video wall controller 601 cannot perform processing on the input video signal on the basis of the genlock signal. Therefore, the signal processing unit ignores the genlock signal, performs only the double speed processing on the input video signal input in synchronization with the frame synchronization signal, and outputs the video signal of the output frame rate synchronized with the frame synchronization signal. Therefore, the output video signal is as illustrated in the third stage from the top in FIG. 17.

As described above, the signal processing unit of the video wall controller 601 can output the video signal synchronized with the frame synchronization signal and having the output frame rate different from the frequency of the genlock signal. As a result, for example, the video camera 11 can re-image the video displayed on the video wall 12 at an output frame rate higher than the frame rate of the re-imaged video. However, the display of video wall 12 cannot be synchronized with re-imaging by video camera 11.

A series of processing of the video wall controller 63 described above can be executed by hardware or software. In a case where the series of processing is executed by software, a program forming the software is installed in a computer. Here, examples of the computer include a computer incorporated in dedicated hardware, and a general-purpose personal computer capable of executing various functions by installing various programs, for example. The configuration of the hardware of the computer that executes the series of processing of the video wall controller 63 by the program is similar to the configuration of the PC 62 in FIG. 5, and thus, is not illustrated. Note that, the program to be executed by the computer may be a program that is processed in time series in the order described in the present specification, or may be a program that is processed in parallel or at required timings such as when a call is made.

In the present specification, the system means a set of a plurality of components (device, module (part), processing, and the like), and it does not matter whether or not all the components are in the same housing. Therefore, any of a plurality of devices housed in separate housings and connected via a network, one device in which a plurality of modules is housed in one housing, and a processing unit that performs a plurality of processes is the system.

An embodiment of the present technology is not limited to the above-described embodiment, and various modifications can be made without departing from the scope of the present technology.

For example, a form in which all or some of the plurality of embodiments described above are combined can be adopted.

For example, the present technology may employ a configuration of cloud computing in which one function is shared and processed in cooperation by a plurality of devices via a network.

Furthermore, each step described in the flowchart described above may be executed by one device, or may be executed in a shared manner by a plurality of devices.

Moreover, in a case where a plurality of pieces of processing is included in one step, the plurality of pieces of processing included in the one step can be executed by one device or shared to be executed by a plurality of devices.

Note that, the effects described in the present specification are merely examples and are not limited, and there may be effects other than those described in the present specification.

The present technology can have the following configurations.

(1)

An information processing system including:

a signal processing unit that, on the basis of an imaging equipment synchronization signal, performs processing on an input video signal that is a video signal of a first frame rate different from a frequency of the imaging equipment synchronization signal; and an output unit that outputs a video signal of a frame rate different from the frequency of the imaging equipment synchronization signal on the basis of the processing on the input video signal.

(2)

The information processing system according to (1) described above, in which the signal processing unit is configured to, on the basis of the imaging equipment synchronization signal, perform processing of, for the input video signal, generating an output video signal that is the video signal of a second frame rate set on the basis of the first frame rate and is synchronized with the imaging equipment synchronization signal.

(3)

The information processing system according to (2) described above, in which the second frame rate is an integral multiple of the frequency of the imaging equipment synchronization signal.

(4)

The information processing system according to (3) described above, in which the second frame rate is a frame rate different from the first frame rate.

(5)

The information processing system according to (4) described above, in which the second frame rate is an integral multiple of the first frame rate.

(6)

The information processing system according to (5) described above, in which the signal processing unit is configured to generate the output video signal by synchronizing the input video signal with the imaging equipment synchronization signal and combining the video signals whose frame rate is an integral multiple.

(7)

The information processing system according to any one of (2) to (6) described above, in which the signal processing unit is configured to, in the output video signal, move a vertical blanking period of each frame included in one cycle of the imaging equipment synchronization signal after a last frame included in one cycle of the imaging equipment synchronization signal.

(8)

The information processing system according to any one of (2) to (7) described above, further including a display control unit that causes a display section to display a video at the second frame rate on the basis of the output video signal generated by the signal processing unit.

(9)

The information processing system according to any one of (2) to (7) described above, further including:

an input unit that acquires the input video signal; and a division unit that divides the output video signal generated by the signal processing unit into output video signals to be displayed on respective display units of a display section including a plurality of the display units, in which the output unit is configured to output the output video signals divided by the division unit to the display units.

(10)

The information processing system according to (9) described above, in which the display section is provided on a first device, the input unit, the signal processing unit, the division unit, and the output unit are provided on a second device different from the first device, and the first device and the second device are connected by a cable.

(11)

The information processing system according to any one of (8) to (10) described above, further including the display section.

(12)

The information processing system according to any one of (8) to (11) described above, in which the display section is configured to emit light by a passive matrix drive system.

(13)

The information processing system according to any one of (8) to (11) described above, in which the display section includes pixels of light emitting diodes (LEDs) arranged in a matrix.

(14)

The information processing system according to any one of (2) to (7) described above, in which the imaging equipment synchronization signal is input to an imaging unit that images a display section that displays a video based on the output video signal.

(15)

The information processing system according to (14) described above, in which the imaging unit is configured to image the display section with the frequency of the imaging equipment synchronization signal as a frame rate of an imaged video in synchronization with the imaging equipment synchronization signal.

(16)

The information processing system according to (14) or (15) described above, in which the imaging unit is configured to perform imaging by a rolling shutter system.

(17)

The information processing system according to any one of (1) to (16) described above, in which a signal generation unit that generates the imaging equipment synchronization signal is configured to input a frame synchronization signal having a frequency same as the first frame rate to a video signal supply unit that supplies the input video signal to the signal processing unit.

(18)

The information processing system according to (17) described above, in which the video signal supply unit is configured to supply the input video signal to the signal processing unit in synchronization with the frame synchronization signal.

(19)

The information processing system according to any one of (1) to (18) described above, in which a frame rate of the imaging equipment synchronization signal is 23.98 Hz.

(20)

An information processing method in an information processing system, the method including:

a signal processing step of, on the basis of an imaging equipment synchronization signal, performing processing on an input video signal that is a video signal of a first frame rate different from a frequency of the imaging equipment synchronization signal; and an output step of outputting a video signal of a frame rate different from the frequency of the imaging equipment synchronization signal on the basis of the processing on the input video signal.

| REFERENCE SIGNS LIST | |
| --- | --- |
| 10 | Re-imaging system |
| 11 | Video camera |
| 12 | Video wall |
| 41-1 to 41-n | Display unit |
| 61 | Video server |
| 63 | Video wall controller |
| 64 | Clock generator |
| 152 | HDMI terminal |
| 153 | DP terminal |
| 154 | DVI terminal |
| 158 | Signal processing unit |
| 160 | Distribution unit |
| 161-1 to 161-n | Signal output IF |
| 221-1 to 221-m | LED driver |
| 241 | LED |

The invention claimed is:

1. An information processing system comprising:

a video wall controller that, on a basis of an imaging equipment synchronization signal, performs processing on an input video signal that is a video signal of a first frame rate different from a frequency of the imaging equipment synchronization signal, and that outputs a video signal of a frame rate different from the frequency of the imaging equipment synchronization signal on a basis of the processing on the input video signal, wherein the imaging equipment synchronization signal is used to synchronize the information processing system to a camera that is external to the information processing system and that images a video displayed according to the video signal of the frame rate different from the frequency of the imaging equipment synchronization signal, wherein the video wall controller is configured to, on a basis of the imaging equipment synchronization signal, perform processing of, for the input video signal, generating an output video signal that is the video signal of a second frame rate set on a basis of the first frame rate and is synchronized with the imaging equipment synchronization signal, and wherein the video wall controller is configured to, in the output video signal, move a vertical blanking period of each frame included in one cycle of the imaging equipment synchronization signal after a last frame included in one cycle of the imaging equipment synchronization signal.

2. The information processing system according to claim 1, wherein the second frame rate is an integral multiple of the frequency of the imaging equipment synchronization signal.

3. The information processing system according to claim 2, wherein the second frame rate is a frame rate different from the first frame rate.

4. The information processing system according to claim 3, wherein the second frame rate is an integral multiple of the first frame rate.

5. The information processing system according to claim 4, wherein the video wall controller is configured to generate the output video signal by synchronizing the input video signal with the imaging equipment synchronization signal and combining the video signals whose frame rate is an integral multiple.

6. The information processing system according to claim 1, further comprising a light emitting diode (LED) driver that causes a display section to display the video at the second frame rate on a basis of the output video signal generated by the video wall controller.

7. The information processing system according to claim 1, wherein the video wall controller:

acquires the input video signal;

divides the output video signal into output video signals to be displayed on respective cabinets of a display section including a plurality of the cabinets, and outputs the video signals to the cabinets.

8. The information processing system according to claim 7, wherein the display section is provided on a first device, the video wall controller is provided on a second device different from the first device, and the first device and the second device are connected by a cable.

9. The information processing system according to claim 7, further comprising the display section.

10. The information processing system according to claim 7, wherein the display section is configured to emit light by a passive matrix drive system.

11. The information processing system according to claim 7, wherein the display section includes pixels of light emitting diodes (LEDs) arranged in a matrix.

12. The information processing system according to claim 1, wherein the camera images a display section that displays the video based on the output video signal.

13. The information processing system according to claim 12, wherein the camera is configured to image the display section with the frequency of the imaging equipment synchronization signal as a frame rate of an imaged video in synchronization with the imaging equipment synchronization signal.

14. The information processing system according to claim 12, wherein the camera is configured to perform imaging by a rolling shutter system.

15. The information processing system according to claim 1, wherein a clock generator that generates the imaging equipment synchronization signal is configured to input a frame synchronization signal having a frequency same as the first frame rate to a server that supplies the input video signal to the video wall controller.

16. The information processing system according to claim 15, wherein the server is configured to supply the input video signal to the video wall controller in synchronization with the frame synchronization signal.

17. The information processing system according to claim 1, wherein a frame rate of the imaging equipment synchronization signal is 23.98 Hz.

18. An information processing method in an information processing system, the method comprising:

a signal processing step of, on a basis of an imaging equipment synchronization signal, performing processing on an input video signal that is a video signal of a first frame rate different from a frequency of the imaging equipment synchronization signal;

an output step of outputting a video signal of a frame rate different from the frequency of the imaging equipment synchronization signal on a basis of the processing on the input video signal, wherein the imaging equipment synchronization signal is used to synchronize the information processing system to a camera that is external to the information processing system and that images a video displayed according to the video signal of the frame rate different from the frequency of the imaging equipment synchronization signal, and wherein the signal processing step comprises generating, for the input video signal on a basis of the imaging equipment synchronization signal, an output video signal that is the video signal of a second frame rate set on a basis of the first frame rate and is synchronized with the imaging equipment synchronization signal; and a moving step of moving, in the output video signal, a vertical blanking period of each frame included in one cycle of the imaging equipment synchronization signal after a last frame included in one cycle of the imaging equipment synchronization signal.

* * * * *